US008971898B2

(12) United States Patent
Maveddat

(10) Patent No.: US 8,971,898 B2
(45) Date of Patent: Mar. 3, 2015

(54) MOBILITY MANAGEMENT APPARATUS AND METHODS

(75) Inventor: Payam Maveddat, Plano, TX (US)

(73) Assignee: Genband US LLC, Plano, TX (US)

( * ) Notice: Subject to any disclaimer, the term of this patent is extended or adjusted under 35 U.S.C. 154(b) by 102 days.

(21) Appl. No.: 11/255,467

(22) Filed: Oct. 21, 2005

(65) Prior Publication Data
US 2006/0111112 A1    May 25, 2006

Related U.S. Application Data

(60) Provisional application No. 60/621,071, filed on Oct. 22, 2004.

(51) Int. Cl.
*H04W 36/00* (2009.01)
*H04W 4/00* (2009.01)
(Continued)

(52) U.S. Cl.
CPC ............ *H04W 8/02* (2013.01); *H04W 36/14* (2013.01); *H04W 8/04* (2013.01); *H04W 8/06* (2013.01);
(Continued)

(58) Field of Classification Search
CPC ..... H04W 88/06; H04W 36/14; H04W 92/02; H04W 36/18; H04W 80/10; H04W 36/0066; H04W 8/02
USPC ...................... 455/433, 434, 436–444, 552.1, 455/331–332; 370/328, 329, 331–333, 338, 370/341; 709/228, 229
See application file for complete search history.

(56) References Cited

U.S. PATENT DOCUMENTS 5,375,121 A    12/1994  Nishino et al.
5,513,185 A *   4/1996  Schmidt ...................... 714/708
(Continued)

FOREIGN PATENT DOCUMENTS

CN    1276950 A    12/2000
CN    1504039 A     6/2004
(Continued)

OTHER PUBLICATIONS

Chinese Official Action for Chinese Patent Application No. 200580043559.1 (Mar. 9, 2010).
(Continued)

*Primary Examiner* — George Eng
*Assistant Examiner* — Nam Huynh
(74) *Attorney, Agent, or Firm* — Jenkins, Wilson, Taylor & Hunt, P.A.

(57) ABSTRACT

A wireless mobility management system including a visitor location register configured to store a visiting user profile and communicate with a mobile switching center to route a wireless call supporting a user-session, a home location register configured to store a home user profile and update a user location associated with the home user profile, and a wireless media gateway (WMG) configured to create a user-session interconnection between a first wireless network and at least one of a second wireless network, a wireline packet network and a public-switched telephone network, including providing physical resources for the user-session. A WMG controller integrated with a wireless softswitch is configured to control the WMG to allocate resources and establish connections as required by the user session. A performance-based mobility manager is configured to receive user-session performance data from the WMG and make a handoff decision based on the performance data.

16 Claims, 10 Drawing Sheets

(51) Int. Cl.
| | |
|---|---|
| *H04W 8/02* | (2009.01) |
| *H04W 36/14* | (2009.01) |
| H04W 8/04 | (2009.01) |
| H04W 8/06 | (2009.01) |
| H04W 36/30 | (2009.01) |
| H04W 76/02 | (2009.01) |
| H04W 88/14 | (2009.01) |
| H04W 88/16 | (2009.01) |
| H04W 92/02 | (2009.01) |

(52) U.S. Cl.
CPC ............... *H04W 36/30* (2013.01); *H04W 76/02* (2013.01); *H04W 88/14* (2013.01); *H04W 88/16* (2013.01); *H04W 92/02* (2013.01)
USPC ........................... 455/444; 455/438; 370/332

(56) References Cited

U.S. PATENT DOCUMENTS

| | | | |
|---|---|---|---|
| 5,905,873 A | 5/1999 | Hartmann et al. | |
| 5,999,529 A | 12/1999 | Bernstein et al. | |
| 6,046,999 A | 4/2000 | Miki et al. | |
| 6,147,988 A | 11/2000 | Bartholomew et al. | |
| 6,167,129 A | 12/2000 | Fikis et al. | |
| 6,339,594 B1 | 1/2002 | Civanlar et al. | |
| 6,625,169 B1 | 9/2003 | Tofano | |
| 6,647,428 B1 | 11/2003 | Bannai et al. | |
| 6,731,627 B1 | 5/2004 | Gupta et al. | |
| 6,791,959 B1* | 9/2004 | Palmer et al. | 370/332 |
| 6,801,771 B1* | 10/2004 | Naqvi et al. | 455/436 |
| 7,006,489 B2 | 2/2006 | Li et al. | |
| 7,054,318 B2 | 5/2006 | Eneroth et al. | |
| 7,054,320 B1 | 5/2006 | Lee et al. | |
| 7,068,623 B1 | 6/2006 | Barany et al. | |
| 7,082,143 B1 | 7/2006 | LeBlanc et al. | |
| 7,180,892 B1 | 2/2007 | Tackin | |
| 7,305,229 B2 | 12/2007 | Fox et al. | |
| 7,398,088 B2* | 7/2008 | Belkin et al. | 455/439 |
| 7,433,690 B2* | 10/2008 | Creamer et al. | 455/437 |
| 7,830,864 B2 | 11/2010 | Li | |
| 2001/0036158 A1 | 11/2001 | Hallenstal et al. | |
| 2002/0085516 A1* | 7/2002 | Bridgelall | 370/329 |
| 2002/0106029 A1 | 8/2002 | Bunn et al. | |
| 2002/0147008 A1* | 10/2002 | Kallio | 455/426 |
| 2003/0112796 A1 | 6/2003 | Kwan | |
| 2003/0119489 A1 | 6/2003 | Mohammed | |
| 2003/0123485 A1 | 7/2003 | Yi et al. | |
| 2004/0008652 A1 | 1/2004 | Tanzella et al. | |
| 2004/0047364 A1 | 3/2004 | Briggs et al. | |
| 2004/0090989 A1 | 5/2004 | Kobayashi | |
| 2004/0192295 A1* | 9/2004 | Tsao et al. | 455/432.1 |
| 2004/0203791 A1* | 10/2004 | Pan et al. | 455/442 |
| 2005/0195829 A1 | 9/2005 | Ward | |
| 2006/0050664 A1 | 3/2006 | Guey | |
| 2006/0062225 A1 | 3/2006 | Li et al. | |
| 2006/0092927 A1 | 5/2006 | Li et al. | |
| 2007/0140214 A1 | 6/2007 | Zoltan | |

FOREIGN PATENT DOCUMENTS

| | | |
|---|---|---|
| DE | 198 29 822 A1 | 1/2000 |
| GB | 2363295 | 12/2001 |
| GB | 2 364 620 A | 1/2002 |
| WO | 99/29136 | 6/1999 |
| WO | WO 02/062094 A2 | 8/2002 |
| WO | WO 2005086421 A1 * | 9/2005 |

OTHER PUBLICATIONS

Final Official Action for U.S. Appl. No. 11/121,626 (Jan. 12, 2010).
Interview Summary for U.S. Appl. No. 11/121,626 (Oct. 15, 2009).
Official Action for U.S. Appl. No. 11/121,626 (May 18, 2009).
Final Official Action for U.S. Appl. No. 11/121,626 (Nov. 13, 2008).
Official Action for U.S. Appl. No. 11/121,626 (Feb. 20, 2008).
International Search Report for International Application No. PCT/US2006/028549 (Dec. 11, 2006).
"Third Generation Partnership Project; Technical Specification Group Core Network and Terminals; Interworking Between the IP Multimedia (IM) Core Network (CN) Subsystem and Cirecuit Switched (CS) Networks (Release 6)" 3GPP TS 29.163, pp. 1-128 (Jun. 2005).
Agilent Technologies, "UMTS Network and Service Assurance," International Engineering Consortium, http://www.iec.org/online/tutorials/agilent_umts_network/topic03.html, pp. 1-4 (Copyright 2005).
"Digital Cellular Telecommunications System Phase (2+); Universal Mobile Telecommunications System (UMTS); AMR Speech Codec, Wideband; Interface to Iu and Uu (3GPP TS 26.202 version 6.0.0 Release 6)," Global System for Mobile Communications ETSI TS 126 202, pp. 1-14 (Dec. 2004).
Eklund et al., "IEEE Standard 802.16: A Technical Overview of the WirelessMAN™ Air Interface for Broadband Wireless Access," IEEE Communications Magazine, pp. 98-107 (Jun. 2002).
Sjoberg et al., "Real-Time Transport Protcol (RTP) Payload Format and File Storage Format for the adaptive Multi-Rate (AMR) and Adaptive Multi-Rate Wideband (AMR-WB) Audio Codecs," Network Working Group, http://www.apps.ietf.org/rfc/rfc3267html, pp. 1-48 (Jun. 2002).
"Third Generation Partnership Project," Meeting Report v3.0.0, 3GPP TSG-TrFO Workshop#04, pp. 1-18 (Oct. 17-19, 2000).
"3$^{rd}$ Generation Partnership Project; Technical Specification Group Services and Systems Aspects; Architecture for an All IP Network," 3GPP TR 23.922 V1.0.0 (Oct. 31, 1999).
Laurence, M. et al., "Voice Over ATM: A Hybrid TDM/ATM Design Approach," electronic Engineering, Morgan-Grampian Ltd., vol. 71, No. 869, Jun. 1999, pp. 81-82, 84, and 86.
Singer, Josef et al., "Narrow band Services Over ATM Networks: Evaluation of Trunking Methods," World Telecommunications Congress, vol. 2, Sep. 21, 1997, pp. 17-25.
Notice of Allowance and Fee(s) Due for U.S. Appl. No. 11/121,626 (Jun. 24, 2010).
Notice of Allowance and Fee(s) Due for U.S. Appl. No. 11/121,626 (May 27, 2010).
Interview Summary for U.S. Appl. No. 11/121,626 (May 21, 2010).
Notice of Being Deemd to have been Withdrawn for Chinese Patent Application No. 20050043559.1 (Jul. 16, 2012).
Extended European Search Report for European Patent Application No. 05815092.1 (Nov. 8, 2011).
Third Office Action for Chinese Patent Application No. 20050043559.1 (Sep. 15, 2011).
Second Office Action for Chinese Patent Application No. 200580043559.1 (Jun. 8, 2011).
Fourth Office Action for Chinese Patent Application No. 20050043559.1 (Feb. 22, 2012).

* cited by examiner

MOBILITY MANAGEMENT APPARATUS AND METHODS

RELATED APPLICATIONS

This application claims the benefit of the earlier priority of commonly assigned U.S. Provisional Application No. 60/621,071, filed Oct. 22, 2004, entitled "MOBILITY MANAGER," which is hereby incorporated in its entirety herein.

This application is also related to commonly assigned U.S. Provisional Application No. 60/611,221, filed Sep. 19, 2004, entitled "MEDIA GATEWAY FOR MULTIPLE WIRELINE AND WIRELESS FORMATS, COMPONENTS THEREOF, AND PROCESSES PERFORMED THEREIN," which is hereby incorporated in its entirety herein.

This application is also related to commonly assigned U.S. Provisional Application No. 60/685,863, filed May 31, 2005, entitled "METHODS AND SYSTEMS FOR UNLICENSED MOBILE ACCESS (UMA) REALIZATION IN A MEDIA GATEWAY," which is hereby incorporated in its entirety herein.

This application is also related to commonly assigned U.S. patent application Ser. No. 11/121,626, filed May 4, 2005, entitled "APPARATUS AND METHODS FOR PER-SESSION SWITCHING FOR MULTIPLE WIRELINE AND WIRELESS DATA TYPES," which is hereby incorporated in its entirety herein.

BACKGROUND

Telecommunication carriers are increasingly offering multi-service packages and bundled services, including various combinations of high bandwidth and other internet services, traditional voice services, and wireless services. Bundled services can allow a carrier to charge a higher fee relative to the fee for any individual one of the bundled services, yet provide value in the sense that the bundled service fee is less than the cumulative fees if the bundled services were purchased individually. Customers are thus provided with incentive to purchase additional services. Moreover, recent market trends indicate extensive consumer demand for these bundled services. However, service carriers are struggling with successfully upgrading existing infrastructures to meet such demand, particularly for high-bandwidth services. One such struggle regards transition networks, which are often employed to join voice and data networks, but can require significant amounts of labor and resources to maintain and upgrade.

The above-described service bundling developments have also been accompanied by service technology developments. However, many emerging technologies are not easily implemented over operational and/or large scale networks. Such obstacles can delay the realization of more versatile, multi-functional networks and/or network components, as well as an expansion towards a greater number of bundled service combinations of time-division multiplexing (TDM), asynchronous transfer mode (ATM), universal mobile telecommunications service (UMTS) and/or other wireless services, voice over internet protocol (VoIp), voice over DSL (VoDSL), wireless local access networks (WLAN), Bluetooth®, broadband wireless access (WiMAX, IEEE 802.16), mobile broadband wireless access (MBWA, IEEE 802.20), ultra wideband access (UWB), and unlicensed mobile access (UMA), among others.

The bundling and technology developments may require more transparent or seamless interworking between wireline networks, macro cellular networks, and broadband access networks, especially for handoffs and calls in progress. However, current network architecture often doesn't satisfactorily allow for seamless mobility between different network types where employing, at least partially, existing cellular network core elements, such as mobile switching centers and home location registers of ANSI-41 and GSM networks.

Additionally, the convergence of IP, wireless technologies (e.g., 3G, WiFi, and WiMax, among others), and wireline PSTN and packet networks continues to present several key challenges and issues. One such challenge is providing a smooth, seamless handoff between wireline and wireless networks and between different types of wireless technologies when faced with the non-guaranteed QoS of IP networks.

BRIEF DESCRIPTION OF THE DRAWINGS

Aspects of the present disclosure are best understood from the following detailed description when read with the accompanying figures. It is emphasized that, as may be in accordance with standard industry practices, various features may not be drawn to scale. For example, the dimensions of various features may be arbitrarily increased or reduced for clarity of discussion.

DETAILED DESCRIPTION

Figure 1A:
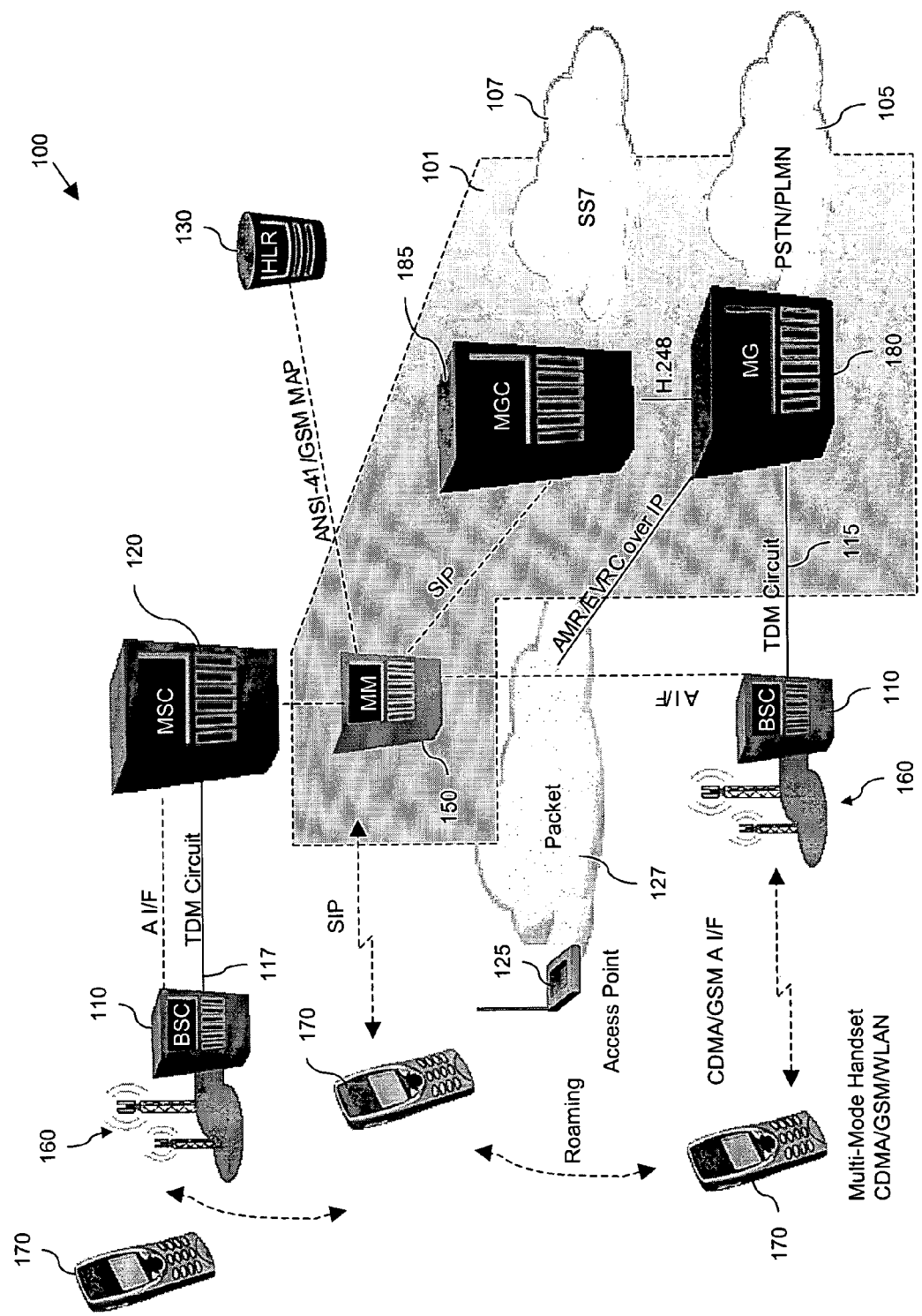
FIG. 1A is a schematic view of at least a portion of an embodiment of network architecture according to aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure introduces aspects of utilizing a mobility manager, media gateway and/or media gateway controller to monitor the performance of traffic at different layers, e.g., at the bearer layer, the signaling layer and/or the application layer. Monitored aspects of the traffic performance may trigger a call handoff such that, in accord with aspects of the present disclosure, calls can more seamlessly transition from a wireless network to a wireline network, such as to a local area network (LAN), or from one type of wireless network to another type of wireless network, such as between 3G and wireless LAN (WLAN) networks.

As broadband wireless access (e.g., WiFi, WiMAX, MBWA, UWB) becomes more widely deployed, wireless and wireline operators are looking for mechanisms to provide seamless interworking between macro cellular networks and broadband access networks, especially for handoffs and calls in progress. However, no current network architecture satisfactorily allows for seamless mobility between these networks using a network element. The present disclosure introduces such a network element, often referred to herein as a mobility manager. Various embodiments of the mobility manager may be in accord with one or more of the aspects described below.

At least in some embodiments, a mobility manager is included or associated with one or more networks or cells, or is otherwise in communication with or associated with one or more mobile switching centers (MSCs). The mobility manager may detect signal strength from a mobile handset or other user equipment (UE) client as the UE client moves closer to a broadband wireless access point within a cell or network (e.g., to within a predetermined proximity thereof). The mobility manager may then start the process of hand-off between systems, networks, or MSCs, such as by sending a request and/or location update to a co-located, connected, or otherwise associated (e.g., in the same network or cell) home location register HLR and updating a co-located, connected, or otherwise associated (e.g., in the same network or cell) visitor location register VLR, such as with subscriber information (or "user" information, where the terms "subscriber" and "user" are used interchangeably herein). The mobility manager may interface with an existing one or more media gateway controllers (MGCs), such as over session initiation protocol (SIP) and/or other real-time call control protocols (e.g., H.248 and/or media gateway control protocol (MGCP)).

Some or all mobile supplementary features may be handled by the mobility manager, whether for SIP/VoIP handsets, 2G radio access network (RAN) handsets (e.g., GSM or CDMA handsets), and/or others. The mobility manager may also act as a traditional, conventional, or future-developed HLR and/or VLR, as an alternative to or in conjunction with existing HLRs and/or VLRs. In some embodiments, the mobility manager may interwork with one or more existing, conventional, or future-developed media gateway controllers (MGCs), including those that do not have wireless (e.g., RAN) interfaces or mobility management capabilities (e.g., HLR signaling or inter-MSC signaling). The mobility manager may also or alternatively perform the task of an existing, traditional, conventional, or future-developed VLRs and/or mobility managers in the context of second generation (2G) networks, among other networks.

In some embodiments, the mobility manager allows or improves seamless hand-off between broadband wireless access and macro cellular networks, while also taking advantage of existing MGCs and/or media gateways (MGs) in the network and/or network elements, such as RAN and other network core elements (e.g., HLR, MSC). The mobility manager may also provide mobility management functions and supplementary feature transparency between RAN and broadband wireless access, such as MGCs/MGs and MSCs for VoP, among others.

Aspects of some embodiments disclosed in the present application may also provide substantially or completely seamless hand-off between broadband wireless access and macro cellular systems, cells, networks, etc. Additionally, or alternatively, some embodiments may provide control of 2G RANs via termination of the RAN air interface (A I/F). One embodiment of a mobility manager according to aspects of the present disclosure is configured to interwork with existing MGCs, MGs, and/or other network elements that are not wireless-enabled (such as softswitches), but which may substantially or entirely act as tandems.

Aspects of some embodiments disclosed in the present application may require an additional network element. However, this additional network element may be easily integrated with the MGC and/or other network element(s) as a complete package.

Aspects of some embodiments disclosed in the present application may allow or assist seamless handoff between cellular and broadband, wireless and wireline access/networks. Some embodiments may also or alternatively allow or assist utilization of existing cellular network core elements (e.g., MSCs, HLRs, among others), whether for ANSI-41, GSM and/or other networks.

Referring to FIG. 1A, illustrated is a schematic view of at least a portion of one embodiment of a network 100 according to aspects of the present disclosure. The network 100 is merely an exemplary embodiment according to one or more aspects of the present disclosure—variations from the embodiment shown in FIG. 1A are also within the scope of the present disclosure. Moreover, the network 100 shown in FIG. 1A may depict architecture for a complete network, more than one network, a portion of a network, or portions of more than one network, which may be collectively referred to herein as a network. The network 100 may be or support one or more of GSM, GPRS, DAMPS, IS-136, IS-95, PDC, CDMA, WCDMA, UMTS, EDGE, and/or other cellular networks (sometimes referred to as "licensed" networks). The network 100 may also be or support one or more of WiFi, WLAN, Bluetooth, VoWiFi, 802.11, WiMAX, MBWA, UWB, and/or other broadband, possibly unlicensed mobile access (UMA) networks, having one or more access points within a cellular network.

In the illustrated embodiment, the network 100 includes at least one base station controller (BSC) 110, at least one mobile switching center (MSC) 120, at least one HLR 130, and at least one VLR 140, among other elements. The network 100 depicted in FIG. 1A also includes at least one mobility manager 150, which may be included, connected to, or otherwise associated with the network 100. Various of these and other elements may be distributed within a single network or across two or more networks.

The BSC 110 may, among other functions, provide an interface between the MSC 120 and at least one base station (BS) and/or base transceiver station (BTS) (collectively designated by reference numeral 160). However, aspects of the present disclosure are applicable to technology generations other than those employing the BSC 110. For example, in embodiments in which the network 100 supports UMTS, the BSC 110 may be a radio station controller (RSC). Similar network element substitutions are also within the scope of the present disclosure (e.g., in 3G networks/systems instead of 1G, 2G, or 2.5G networks/systems). Accordingly, reference herein to particular network elements (including in the figures) that are conventionally employed in particular generations may include the functionally similar or equivalent elements in other generations. Thus, for example, reference hereafter to a BSC 110 may be considered to include an RSC. Embodiments of the network 100 shown in FIG. 1A within the scope of the present disclosure may also include combinations of conventional and/or future-developed networks, systems, network elements, or generations. For example, one embodiment of the network 100 may include a BSC 110 and a RSC or multiple instances thereof.

Each BS 160 provides an interface between a BSC 110 and a plurality of mobile or wireless handsets, phones, PDAs, terminals, or other user equipment clients ("UE client 170"). The UE clients 170 may each be single mode, dual mode, or multi-mode. For example, in one embodiment, one or more of the UE clients 170 may be configured to operate within CDMA networks, GSM networks, and WLAN networks, among other combinations. UMA-enabled mobile stations are WLAN-enabled cellular handsets running UMA client software. The client software lets the WLAN radio within a handset appear as a parallel radio resource to the GSM radio. By integrating in this fashion, the higher level services and applications within the handset remain entirely unchanged. The fact that a service may be delivered over the WLAN radio versus the GSM radio is entirely abstracted from the higher level service and control logic within the handset.

The HLR 130 is the location register to which a user profile and/or identity is assigned for record purposes. The recorded user profile/identity information may include subscriber information such as, without limitation, the electronic serial number (ESN) of the subscriber's mobile device, the subscriber's current location, the subscriber's authorization period, and other profile information associated with the subscriber. The HLR 130 may be located within the MSC 120, possibly to the extent that the HLR 130 is indistinguishable from the MSC 120, whether physically, logically, with respect to connectivity, or otherwise. However, in other embodiments, such as in the embodiment depicted in FIG. 1A, the HLR 130 may not be integrated with the MSC 120, but may instead be a discrete component of the architecture/network 100 that is located proximate to or distal from the MSC 120. The HLR 130 may also serve one MSC 120, as in the illustrated embodiment, or more than one MSC 120. The HLR 130 may also be distributed over more than one physical entity, such as where multiple physically-discrete components are configured to cooperatively operate as a single HLR 130.

The MSC 120 may also be configured to operate as a VLR. The VLR is the location register used by MSC 120 to retrieve information for handling calls to or from a visiting subscriber. The VLR may be located within the MSC 120, possibly to the extent that the VLR is indistinguishable from the MSC 120, whether physically, logically, with respect to connectivity, or otherwise. However, in other embodiments, the VLR may not be integrated with the MSC 120, but may instead be a discrete component of the architecture/network 100 that is located proximate to or distal from the MSC 120. The VLR may also serve one MSC 120, or more than one MSC 120.

The VLR and the HLR 130 can be viewed as a two-level data hierarchy that is employed to track a wireless device. In general, each wireless network includes an HLR 130, and users are permanently associated with the HLR 130 in their subscribed network. Information about each user, such as the types of services subscribed, billing information, and location information, are stored in a user profile located at the HLR 130. However, the number of VLRs and their placements within a network may vary among networks. Each VLR may store information pertaining to a wireless device that is visiting a network associated with the network's HLR 130.

The MSC 120 may be integrated or otherwise combined with a wireless softswitch, such as a wireless softswitch having one or more aspects similar to those of the wireless softswitch 390 shown in FIG. 3 and described further below. The MSC 120 may be an automatic system which constitutes the interface for user traffic between a cellular network, other public switched networks, and/or other MSCs in the same or other wireless networks. Services and applications such as call processing and location registration may be achieved by the exchange of signaling messages through a signaling network such as a Signal System 7 (SS7). SS7 is the protocol used for signaling exchange, whereas the signaling network is referred to as the SS7 network.

The MSC 120 may also be configured to operate in collaboration with a wireless softswitch and/or a wireless media gateway controller, possibly to the extent that two or more of the MSC 120, the wireless softswitch and the wireless media gateway controller are integrated or otherwise combined, whether physically, logically or both. In such embodiments, such collaboration may support the allocation and management of physical resources for user applications.

Interfaces between the MSC 120 and the HLR 130 and between the MSC 120 and the VLR may be standard-based. For example, depending on the wireless technology in use, MAP may be employed for GSM, IS-41 may be employed for CDMA, and IP-based protocol such as SIP may be employed for new generations of converged wireless and wireline networks. However, the scope of the present application is not limited to these example.

Figure 4:
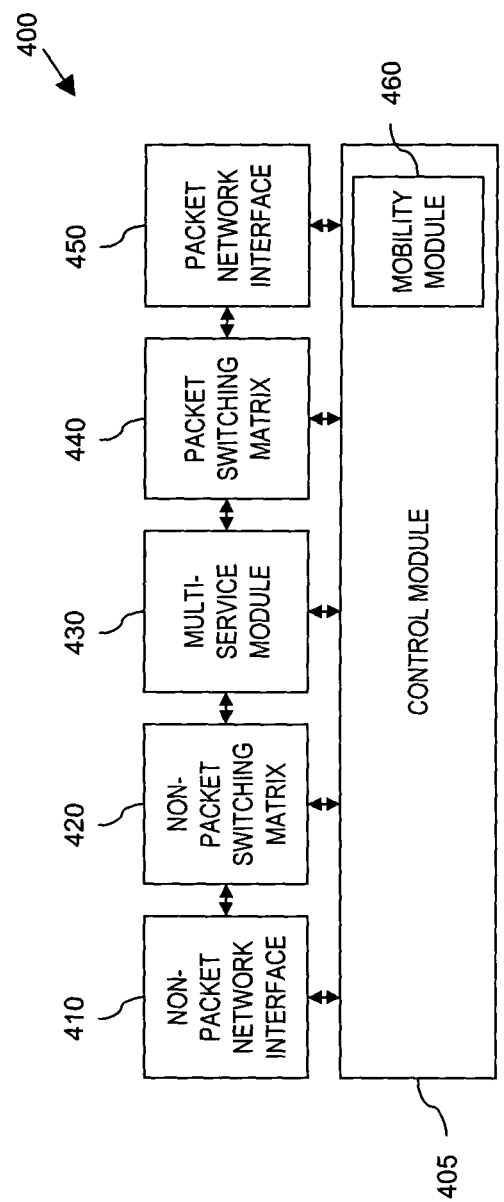
FIG. 4 is a block diagram of at least a portion of an embodiment of a wireless media gateway according to aspects of the present disclosure.

The network 100 also includes at least one media gateway (MG) 180. Although not limited to such within the scope of the present disclosure, the MG 180 may be or include one or more circuit switches, internet-protocol (IP) gateways, and/or channel banks, which may convert data from a format required for one type of network to a different format required for another type of network. The MG 180 may terminate channels from a circuit-switched network as well as streaming or other media from a packet-switched network, such as real-time-transport-protocol (RTP) streams in an IP network. Data input at the MG 180 may be audio, video, and/or T.120 (real-time multi-point communications), among others, which the MG 180 may handle simultaneously or otherwise. One embodiment of the MG 180 is shown in FIG. 4, as further described below.

The network 100 may also include a softswitch 190, which may be or include an open application program interface (API—also possibly referred to as application interface or application programming interface). The softswitch 190, MG 180 and/or component(s) thereof may be singularly or collectively employed to bridge one or more public switched telephone networks (PSTNs), voice-over-packet (VoP) networks, PSTN applications and/or apparatus, VoP applications and/or apparatus, and/or WLAN networks and/or apparatus, among others. PSTN may employ time-division multiplexing (TDM), among other formats and/or protocol. VoP may employ asynchronous transfer mode (ATM), voice-over-internet-protocol (VoIP), UTMS, and/or code-division-multiple-access (CDMA, such as CDMA2000 and/or W-CDMA), among others. WLAN may employ WiFi, VoWiFi, Bluetooth, 802.11, among other ethernet or UMA formats or protocols.

The network 100 also includes a media gateway controller (MGC) 185, which may be combined with, include, or replace the softswitch 190 described above (e.g., the MGC 185 may be a softswitch, or the MGC 185 may perform at least the functions of a softswitch). The MGC 185 may include a call manager, a subscriber profile manager, a facility resource manager, a signaling gateway manager, and/or a mobility manager, among other functions.

A subscriber profile manager (or subscriber profile manager function) may be configured to retrieve subscriber data for validation, such as at call origination and termination. A subscriber profile manager may also or alternatively be configured to provide framework for subscriber features, and/or an API (e.g., for quick feature development). An evolution path to off-board advanced intelligent network (AIN) triggers may also or alternatively be provided by a subscriber manager. A subscriber profile manager may be located on/in a dedicated, stand-alone processor or integrated with additional functions or apparatus. Subscriber profile managers within the scope of the present disclosure may be conventional or future-developed, and may include any combination of the above-described characteristics, among others.

A facility manager (or facility manager function) may be configured to provide trunk and line allocation service for call processing, handle non-call-associated signaling (e.g., an ISUP BLO message), and/or process requests to remove trunks or lines from service due to faults or manual intervention. A facility manager may also or alternatively be configured to process requests to then return them to service. A facility manager may be located on/in a dedicated, stand-alone processor or integrated with additional functions or apparatus. Facility managers within the scope of the present disclosure may be conventional or future-developed, and may include any combination of the above-described characteristics, among others.

A call manager (or call manager function) may be configured to provide a generic, trigger-based, state-machine driven call model, and/or to support distributed call processing. A call manager may be independent of external physical signaling interfaces and protocols, and may be configured to handle a variety of bearer traffic. In some embodiments, each MSC may have a maximum of one instance of a call manager or call manager function. In one embodiment, a system or network may have a minimum of two instances of a call manager or call manager function, such as to obtain fault tolerance. Some embodiments may not require or otherwise include a fixed association of defined ratio between channels and the number of instances of a call manager or call manager function. A call manager may also or alternatively support distributing call traffic across all in-service processes, and/or be configured to provide or support call preservation, such as through checkpointing of critical call information at ringing and stable call states. A call manager may be located on/in a dedicated, stand-alone processor or integrated with additional functions or apparatus. Call managers within the scope of the present disclosure may be conventional or future-developed, and may include any combination of the above-described characteristics, among others.

A signaling gateway manager (or signaling gateway manager function) may be configured to support Point Code operations, and may also or alternatively be configured to be or support fault tolerance. A signaling gateway manager may comply with, enable compliance with, or otherwise support ITU standards, ANSI signaling standards, SIP, Megaco/H.248 and/or other gateway control protocols. A signaling gateway manager may be located on/in a dedicated, stand-alone processor or integrated with additional functions or apparatus. Signaling gateway managers within the scope of the present disclosure may be conventional or future-developed, and may include any combination of the above-described characteristics, among others.

A mobility manager (or mobility manager function) may provide seamless or substantially seamless call hand-off between a WiFi network and a cellular network, between a WiFi and a PSTN network, and/or between a WiFi network and a packet network, among other inter-network hand-offs. The mobility manager may also or alternatively provide subscriber authentication and/or session authentication, verification and/or call control, such as by SIP and H.248 protocols. The mobility manager may also or alternatively provide interfacing for the HLR and/or other elements/systems, such as for subscriber authentication, service feature applications, and others. The mobility manager may also or alternatively provide subscriber location management. A mobility manager may be located on/in a dedicated, stand-alone processor or integrated with additional functions or apparatus. Mobility managers within the scope of the present disclosure may include any combination of the above-described characteristics, among others.

The mobility manager (or mobility manager function) may be implemented as the mobility manager 150 shown in FIG. 1A. Alternatively, or additionally, the mobility manager (or mobility manager function) may be implemented in another of the elements of the network 100 shown in FIG. 1A, including where such elements are otherwise partially or substantially conventional in nature and/or operation.

The MG 180 may be in communication with a PSTN, PLMN, and/or other switched network(s) 105. Communication between the MG 180 and MGC 185 may be by H.248, Megaco, and/or other protocols. The MG 180 may also be in communication with at least one BSC 110 by, for example, at least one TDM circuit 115. The MG 180 may also or alternatively be in communication with one or more WLAN or other broadband or UMA access points 125, or the packet interface(s) or packet network(s) interconnecting such access points 125 (collectively designated in FIG. 1A by reference numeral 127). For example, such communication with an access point 125 may be via AMR/EVRC or other voice codec types over IP, across an IP or other packet-based network 127. Of course, the scope of the present disclosure is not limited to such interconnections or protocols/formats therefore, and includes other conventional or future-developed interconnections and/or other protocols/formats. Access points (APs) provide Wi-Fi or Bluetooth coverage and a link to the broadband IP network for the UMA solution. The APs don't require any UMA-specific technology. The UMA mobile devices can use any generic off-the-shelf APs.

The AP may be part of a residential WLAN, an enterprise WLAN, or a public wireless hotspot. The UMA mobile device, provided it's authorized to use the WLAN, will connect directly with the UNC in the mobile network to establish network connectivity between the mobile station and the mobile core network.

The MGC 185 may also be in communication with an SS7 and/or other signaling network 107 in a conventional or future-developed fashion. As described above, the MGC 185 may also be in communication with the mobility manager 150 (or multiple instances thereof) via SIP and/or other protocols/formats. Of course, the scope of the present disclosure is not limited to such interconnections or protocols/formats therefore, and includes other conventional or future-developed interconnections and/or other protocols/formats.

The mobility manager 150 may also be in communication with the MSC 120, HLR 130, and/or VLR 140, or multiple instances thereof, such as by ANSI-41/GSM Map. As described above, the mobility manager 150 may also be in communication with sufficiently proximate UE clients 170, such as by SIP and/or other protocols/formats. Of course, the scope of the present disclosure is not limited to such interconnections or protocols/formats therefor, and includes other conventional or future-developed interconnections and/or other protocols/formats.

The MSC 120 may also be in communication with at least one BSC 110 by at least one TDM circuit 117 and/or others, and each BS 160 may also be in communication with one or more UE clients 170 by CDMA, GSM, and/or other A I/F. Of course, the scope of the present disclosure is not limited to such interconnections or protocols/formats therefore, and includes other conventional or future-developed interconnections and/or other protocols/formats.

In one embodiment, the mobility manager 150, the MG 180, and the MGC 185 may substantially comprise or form a core wireless network 101, where each element of the core network 101 may be of conventional or legacy technology, except to the extent that the MG 180, MGC 185 and/or other element of the core network 101 may be integrated with the mobility manager 150, or may be integrated with mobility management functions described herein. Additionally, or alternatively, two or more of the VLR 140, the mobility manager 150, the MG 180, the MGC 185, and the softswitch 190 may be co-located, may be integrated as a single element of the network 100, may have shared resources (e.g., computing and/or communication resources), or may otherwise operate in close association with one another. For example, in the embodiment depicted in FIG. 1A, the mobility manager 150, the MG 180 and the MGC 185 depicted as belonging to the core network 101 may exhibit such an association, whether or not such elements compose a core network. For example, such may be the case where these three network elements are each located in close proximity relative to the others. One such implementation may include the mobility manager 150, the MG 180 and the MGC 185 being implemented within side-by-side enclosures, or possibly a single enclosure, including to the extent where two or more of the mobility manager 150, the MG 180 and the MGC 185 may share computing resource (e.g., power supply, backplane and other communication means, thermal management means, and others).

Figure 1B:
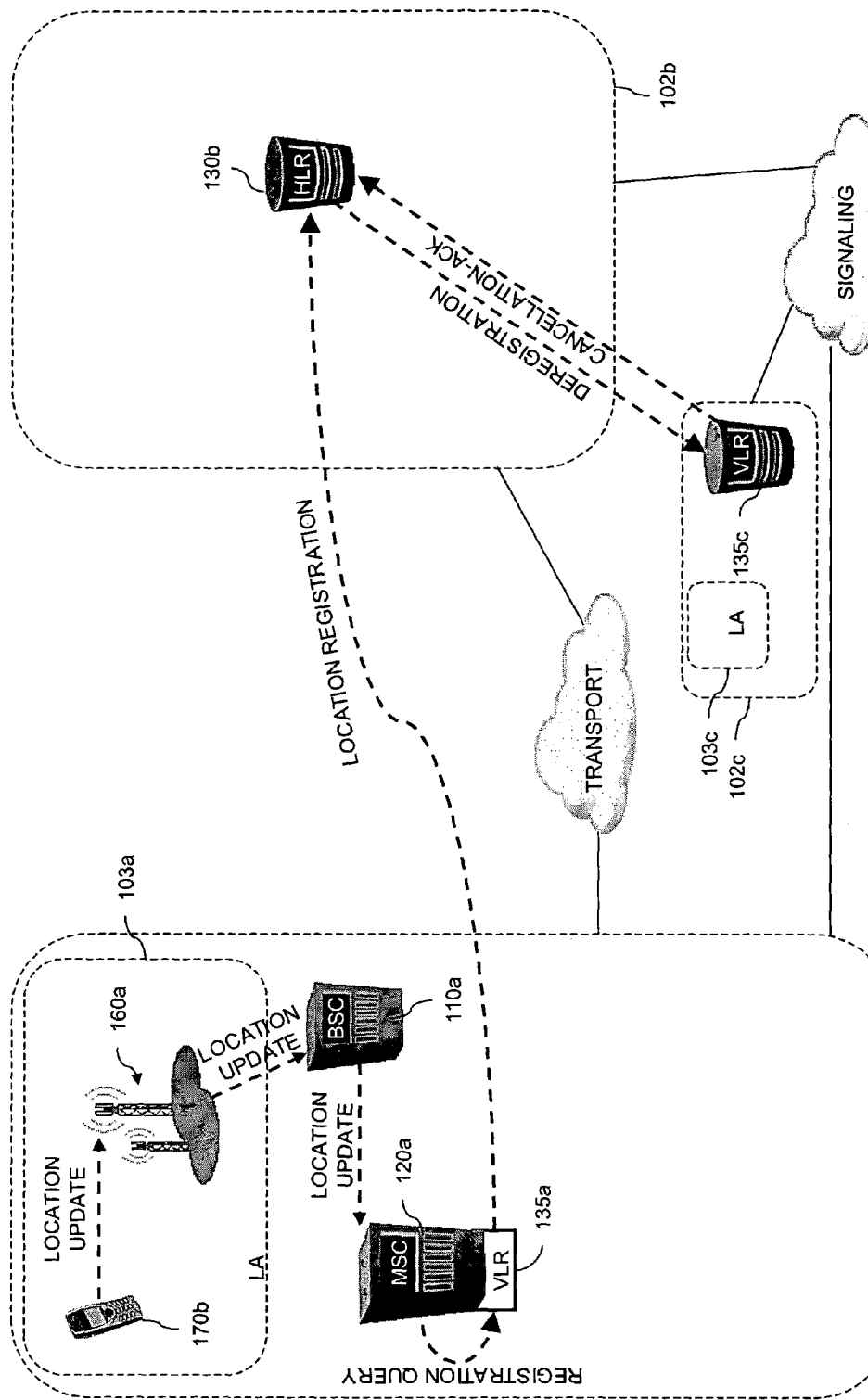
FIG. 1B is another schematic view of the network architecture shown in FIG. 1A.

Referring to FIG. 1B, with continued reference to FIG. 1A, illustrated is a schematic view of network architecture that is similar to that shown in FIG. 1A. According to aspects of the present disclosure, a performance-based mobility management system may be operable to manage user mobility in collaboration with the above-mentioned network elements, and may provide uninterrupted service despite a user's physical location changes, the network environment, and/or other conditions associated with a mobile user. One embodiment of such mobile user handoff is described below. However, the following embodiment description is provided merely as an example, whereas the scope of the present disclosure also includes other embodiments, including those having one or more aspects that are similar to those of the following example.

The schematic view shown in FIG. 1B depicts at least portions of three separate networks 102a-102c. The network 102b is a "home" network for a wireless device 170b which has "roamed" from a serving area or location area (LA) 103c of network 102c into LA 103a of network 102a.

The illustrated components of network 102a include base station 160a, BSC 110a, and MSC 120a with integrated or otherwise co-located VLR 135a, although others also exist. Similarly, the illustrated components of network 102b includes HLR 130b, and the illustrated component of network 102c includes VLR 135c, although others also exist. One or more components and/or aspects of the networks 102a-102c may be substantially similar to those of network 100 and/or network 101 shown in FIG. 1A.

Call handoff procedures begin when the wireless device 170b enters the new serving area 103a and transmits a location-update message to the BSC 110a via the BS 160a. The BSC 110a forwards the location-update message to the MSC 120a, which launches a registration query to its associated VLR 135a. The VLR 135a updates its record on the location of the wireless device 170b. The VLR 135a also determines the address of the HLR 130b of the wireless device 170b from its mobile identification number (MIN). This may be achieved by a table lookup procedure, such as global Title Translation. The new VLR 135a then sends a location-registration message to the HLR 130b.

The HLR 130b then performs an authentication procedure on the wireless device 170b and records the ID of the new serving VLR 135a. The HLR 130b also sends a deregistration message to the old VLR 135c. The old VLR 135c removes the record of the wireless device 170b and returns a cancellation-acknowledgement message to the HLR 130b.

Figure 1C:
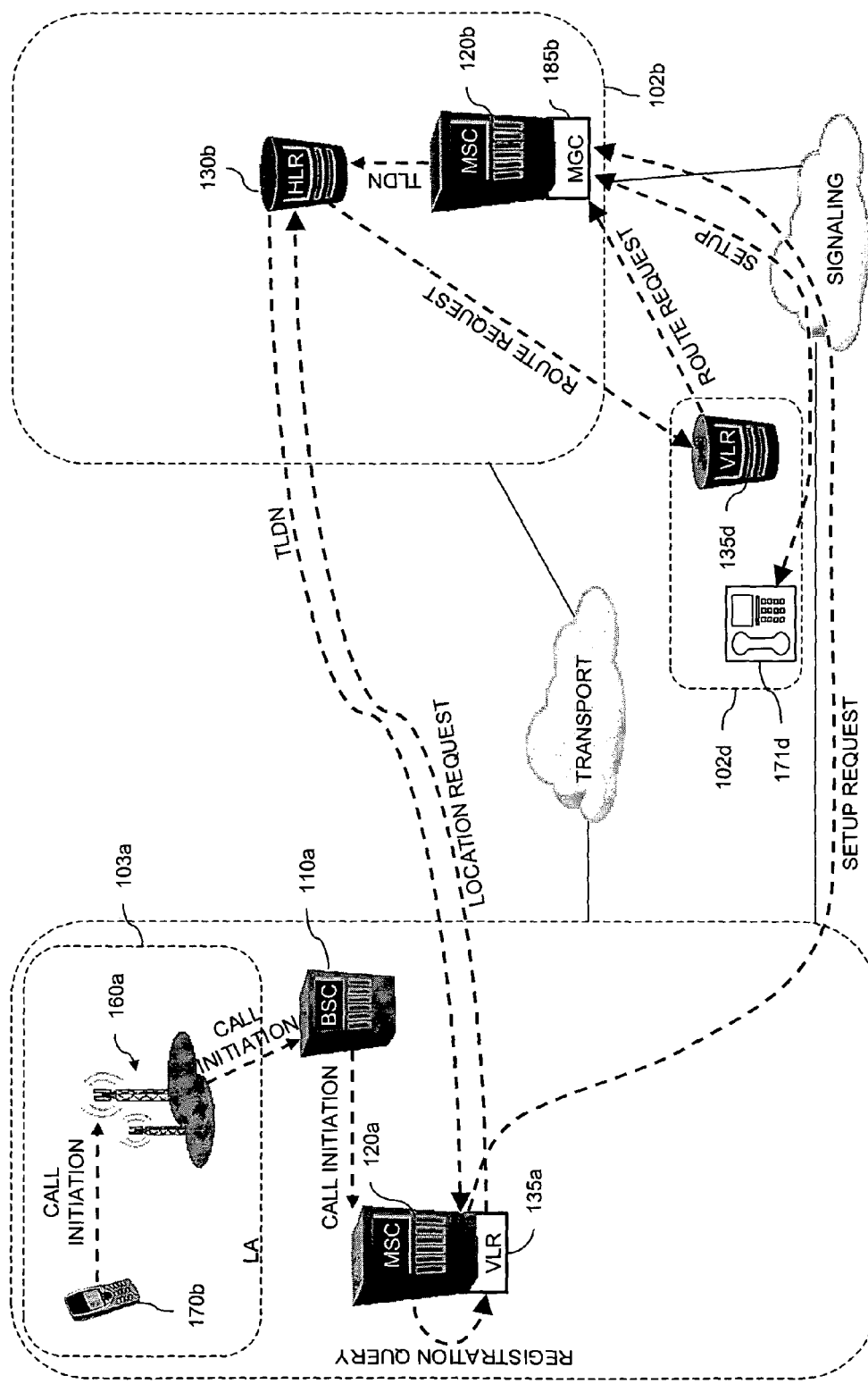
FIG. 1C is another schematic view of the network architecture shown in FIG. 1A.

Once the wireless device 170b is under the control the network 102a, a call originating from the wireless device 170b can be placed. Referring to FIG. 1C, with continued reference to FIGS. 1A and 1B, illustrated is another schematic view of network architecture that is similar to that shown in FIG. 1B and demonstrating an embodiment of the steps and network components involved in such a call, where the called party is an SIP phone 171d in another network 102d. The illustrated components of network 102d include VLR 135d and SIP phone 171d, although others also exist. One or more components and/or aspects of the network 102d may be substantially similar to those of networks 100, 101 and/or 102a-c shown in FIGS. 1A and 1B.

The wireless device 170b may initially send a call initiation signal to the serving MSC 120a through the associated BS 160a/BSC 110a. The MSC 120a then determines the address of the HLR 130b of the called party, possibly through global title translation, and sends a location request message to the HLR 130b of the called party.

The HLR 130b determines the serving VLR 135d and sends a route request message to the VLR 135d. The VLR 135d forwards the route request message to the serving MSC 120b, if the called party is wireless device, or to a MSC 120b/MGC 185b combination if the called party is a wireline device. The MSC 120b/MGC 185b of the called party allocates a temporary ID, called temporary local directory number (TLDN), to the called device 171d, and sends a reply to the HLR 130b together with the temporary ID. The HLR 130b forwards this information to the MSC 120a of the calling party.

The calling MSC 120a then sends a call setup request to the called MSC 120b/MGC 185b through a signaling network (e.g, a SIP network or SS7 network). The called party 171d then responds to the call setup message, and possibly one or more additional hand shakes, to complete call setup.

Figure 2:
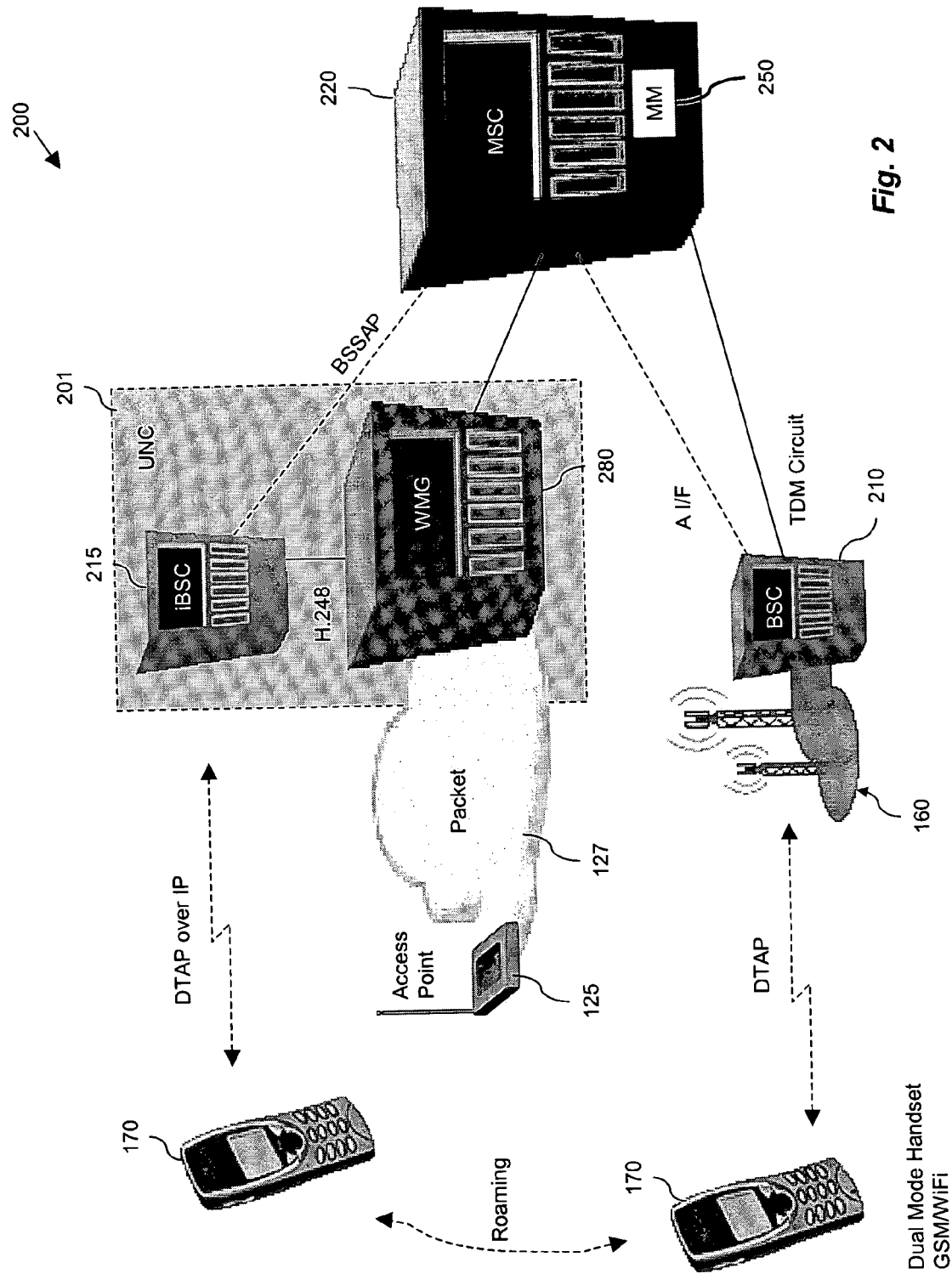
FIG. 2 is a schematic of at least a portion of an embodiment of VoWiFi with legacy core-architecture having aspects related to the architecture shown in FIG. 1A.

Referring to FIG. 2, illustrated is a schematic view of at least a portion of another embodiment of the network 100 shown in FIG. 1A, herein designated by reference numeral 200. The network 200 demonstrates aspects of implementing VoWiFi (Voice-over-WiFi) with legacy core architecture. However, as with the network 100 shown in FIG. 1A, the network 200 is merely an exemplary embodiment according to one or more aspects of the present disclosure—variations from the embodiment shown in FIG. 2 are also within the scope of the present disclosure.

Aspects of the network 200 may be similar those shown in FIGS. 1A-1C. Moreover, the network 200 shown in FIG. 2 may depict architecture for a complete network, more than one network, a portion of a network, or portions of more than one network, which may be collectively referred to herein as a network. Although the network 200 is depicted as an implementation of VoWiFi, the network 200 may additionally support one or more of GSM, GPRS, DAMPS, IS-136, IS-95, PDC, CDMA, WCDMA, UMTS, EDGE, and/or other cellular networks, as well as other WiFi, WLAN, Bluetooth, VoWiFi, 802.11, and/or other broadband or unlicensed mobile access (UMA) networks having one or more access points within a cellular network.

In the illustrated embodiment, the network 200 includes at least one BSC 210 and at least one MSC 220, each of which may be substantially similar to the BSC 110 and the MSC 120, respectively, described above. The network 200 also includes at least one mobility manager element or function 250, schematically depicted as being integral to the MSC 220. Apart from the integration within the MSC 220, the mobility manager 250 and the MSC 220 may otherwise be substantially similar to those described elsewhere herein (e.g., to the MSC 120 and the mobility manager 150, respectively, shown in FIG. 1A). Various of these and other elements may be distributed within a single network or across two or more networks.

The BSC 110 communicates with UE clients 170 via at least one BS 160. Each UE client 170 may be single mode, dual mode, or multi-mode handsets substantially similar to those shown in FIG. 1A, although the UE clients 170 are depicted in FIG. 2 as being dual-mode, GSM/WiFi handsets, and thus configured for VoWiFi operation. One or more of the UE clients 170 may communicate with a BSC 210 via the associated BS 160 via DTAP (Direct Transfer Application Part, or Direct Transfer Application sub-Part, also known as GSM L3, depending on the implementation/technology generation). One or more of the UE clients 170 may alternatively communicate with iBSC (integrated BSC) 215, or may be configured to communicate with both the BSC 210 and the iBSC 215. The iBSC 215 may be substantially similar to the BSC 210 with the exception of added functionality, including functionality other than that conventionally found in a BSC. For example, the iBSC 215 may include functions traditionally found in one or more of a conventional MSC, BS, BTS, and/or other wireless communications network element. Communication between a UE client 170 and the iBSC 215 may be via DTAP or variations thereof, including DTAP over IP.

The network 200 also includes at least one access point 125 that is substantially similar to the access point 125 shown in FIG. 1A, as well as at least one MG 280, depicted in the embodiment shown in FIG. 2 as a wireless MG (WMG). The WMG 280 may be substantially similar to the MG 180 shown in FIG. 1A, and is configured to receive, switch, and send wireless-origin and/or packet communications in addition to TDM/PCM communications. The WMG 280 may interconnect a wireless network with another wireless network of the same or different wireless technology, with a packet wireline network, and/or with a traditional PSTN network. The WMG 280 may also provide protocol conversion between different networks, such as at the transport layer. The WMG 280 may also provide physical resources for a user session or call, such as physical connection, codec, voice compression and echo cancellation, among others. One embodiment of the WMG 280 is shown in FIG. 4, as further described below. Additional aspects of the WMG 280 are disclosed in commonly-assigned U.S. patent application Ser. No. 11/121,626, filed May 4, 2005, entitled "APPARATUS AND METHODS FOR PER-SESSION SWITCHING FOR MULTIPLE WIRELINE AND WIRELESS DATA TYPES."

The WMG 280 may also be configured to communicate with the iBSC 215 or other BSC via one or more of various suitable protocols, including without limitation MGCP, H.248 and/or MEGACO. One or more functions of the iBSC 215 and the WMG 280 may thus cooperate to form or operate as a UMA network controller (UNC) 201. The iBSC 215 and/or other function/element of the UNC 201 may be configured to communicate with the MSC 220, possibly via BSSAP (Base Station System Application Part), another protocol conventionally utilized for communication between a BS and an MSC, and/or other protocols.

The UNC 201 may also operate as an interface to the cellular network serviced by the one or more BS 160 as if the UNC 201 was a conventional BS, as well as to public or private IP and other packet-based networks 127 to communicate with WiFi, WiMAX, MBWA, UWB, and other UMA-enabled user-equipment 170. For example, in an embodiment in which the cellular network is a GSM/GPRS network, the UNC 201 may provide the GSM A-interface for circuit-switched voice services and the GPRS Gb interface for packet data services. Within the UMA network serviced by the access point 125, the interface between the UNC 201 and the user-equipment 170 may be defined as the "up" interface. The UNC 201 may use standard IP transport (or other standard or non-standard packet transport) to support the up interfaces to each access point 125. The UNC 201 may maintain end-to-end communication with each access point 125 and relay cellular network control/signaling and voice traffic over the A/Gb interface towards the cellular network.

In some embodiments, the UNC 201 may considered the primary network element responsible for UMA network appear as a conventional GERAN to the cellular network. For example, in providing secure, private communications over unlicensed, packet-based networks between each user-equipment 170 and the cellular network, the UNC 201 may provide discovery, registration and redirection services to allow the access points 125 to communicate with the appropriate UNC 201, where more than one UNC 201 is available for operation within a particular implementation. The UNC 201 may also be configured to setup and tear down UMA network bearer connections for packet and non-packet (e.g., circuit) services. The UNC 201 may also transcode the voice bearer from VoIP transport to voice-over-circuit transport towards a conventional PCM-based A-interface. In one embodiment, the UNC 201 is also configured to emulate paging, handover and similar cellular-oriented features.

In one embodiment, the iBSC 215 and the WMG 280 may substantially comprise or form a core wireless network 201, where each element of the core network 201 may be of conventional or legacy technology. Thus, contrary to other examples described herein, the mobility management function (e.g., of mobility manager 250) may be embodied in a network component outside the core network 201. Of course, in other examples of the embodiment shown in FIG. 2, an element of the core network 201 may indeed be integrated with the mobility manager 250, or may be integrated with mobility management functions described herein. For example, the MSC 220 may form part of the core network 201. Additionally, or alternatively, the core network 201 may substantially form the UNC 201, or substantially function as the UNC 201, while in other embodiments the core network 201 may include an additional element partially or substantially operating as the UNC 201, including where such element is dedicated to UNC functionality or includes additional functionality.

Figure 3:
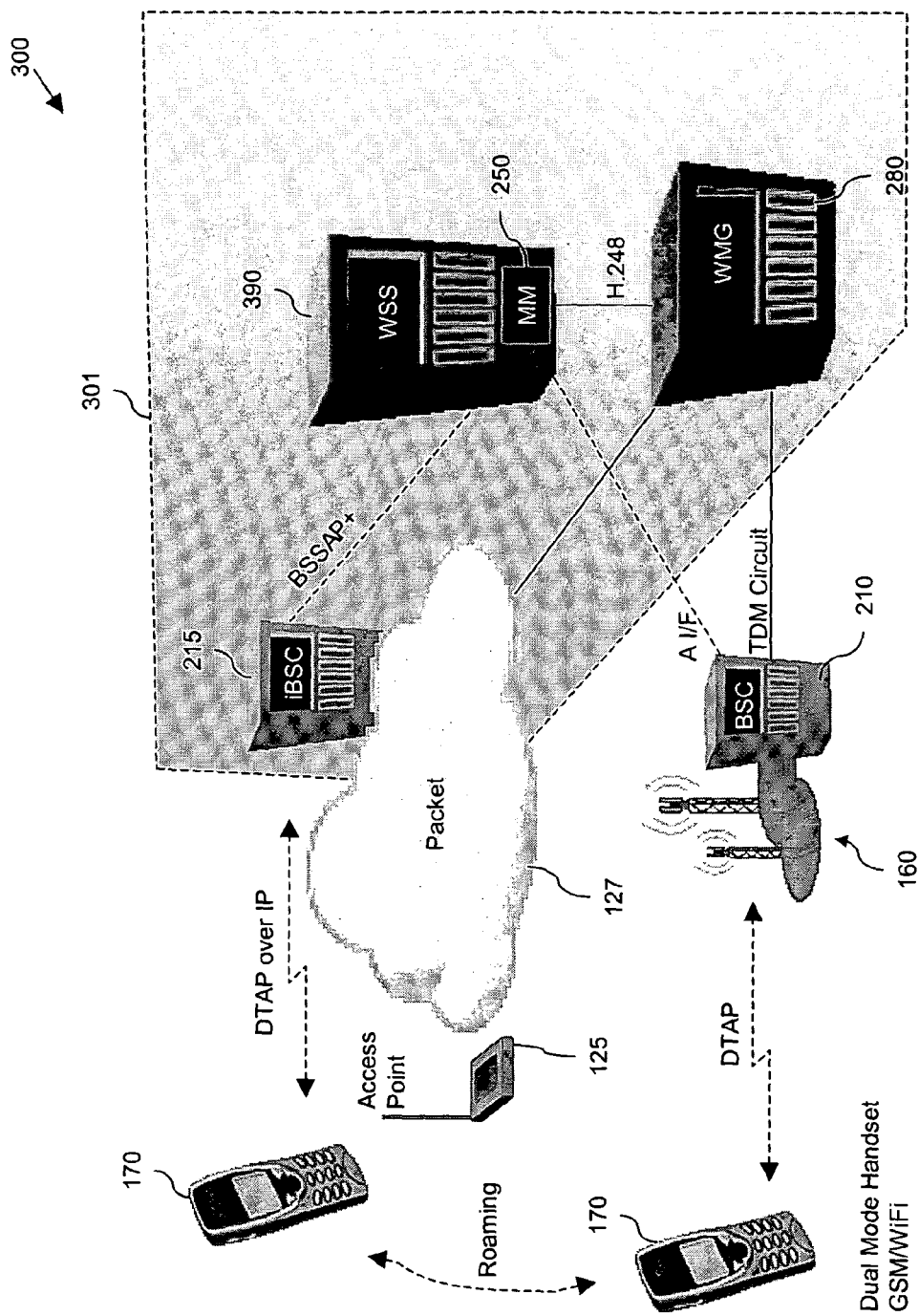
FIG. 3 is a schematic of at least a portion of an embodiment of VoWiFi with next-generation core-architecture having aspects related to the architecture shown in FIG. 1A.

Referring to FIG. 3, illustrated is a schematic view of at least a portion of another embodiment of the network 100 shown in FIG. 1A, herein designated by reference numeral 300. The network 300 demonstrates aspects of implementing VoWiFi (Voice-over-WiFi) with next-generation core architecture. However, as with the network 100 shown in FIG. 1A, the network 300 is merely an exemplary embodiment according to one or more aspects of the present disclosure—variations from the embodiment shown in FIG. 3 are also within the scope of the present disclosure.

Aspects of the network 300 may be similar those of the network 100 shown in FIG. 1A. Moreover, the network 300 shown in FIG. 3 may depict architecture for a complete network, more than one network, a portion of a network, or portions of more than one network, which may be collectively referred to herein as a network. Although the network 300 is depicted as an implementation of VoWiFi, the network 300 may additionally support one or more of GSM, GPRS, DAMPS, IS-136, IS-95, PDC, CDMA, WCDMA, UMTS, EDGE, and/or other cellular networks, as well as other Bluetooth, VoWiFi, IEEE 802.11, IEEE 802.16, IEEE 802.20, and/or other broadband or unlicensed mobile access (UMA) networks having one or more access points within a cellular network.

In the illustrated embodiment, the network 300 includes at least one BSC 210 which may be substantially similar to the BSC 110 shown in FIG. 1A, at least one WMG 280 which may be substantially similar to the WMG 280 shown in FIG. 2, and at least one iBSC 215 which may be substantially similar to the BSC 110 shown in FIG. 1A and/or the iBSC 215 shown in FIG. 2. The network 300 also includes at least one mobility manager element or function 250, schematically depicted as being integral to a wireless softswitch (WSS) 390. Apart from the integration within the WSS 390, the mobility manager 250 may otherwise be substantially similar to as described elsewhere herein (e.g., to the mobility manager 150 shown in FIG. 1A). Various of these and other elements may be distributed within a single network or across two or more networks.

The WSS 390 may be or include an open API and, whether separately or in conjunction with the WMG 280 and/or other elements of the network 300, may be utilized to bridge one or more PSTNs, VoP networks, PSTN applications and/or apparatus, VoP applications and/or apparatus, and/or WLAN networks and/or apparatus, among others. In general, the WSS 390 is operable to manage call control functions, which are separated from switching functions managed by the WMG 280 and/or other separate elements of the network 300. The WSS 390 may be specifically configured to operate in conjunction with a WMG, or even a particular WMG, to cooperatively manage call control and switching functions in at least the cellular network. With the addition of the mobility manager 250, the WSS 390 may additionally be configured to manage call control functions of UMA communications to and from an unlicensed wireless access point 125 over packet-based network 127.

The WSS 390 may also be integrated or otherwise combined (whether physically and/or logically) with a wireless media gateway controller (WMGC). The WMGC may be responsible for allocating and managing the physical resources of one or more WMG 280, such as for user applications like a voice or multimedia call.

For example, the mobility manager 250 and/or other function of the WSS 390 may communicate with the iBSC 215 (such as via BSSAP or an extension thereof) to support licensed and unlicensed wireless communications, where the iBSC 215 and/or other elements of the network 300 may be configured to function, at least in part, as a UNC. That is, the iBSC 215 may support licensed wireless communications with user-equipment 170 (for example, via DTAP over IP), and may also support unlicensed wireless communications with user-equipment via packet-based network 127 and access point 125 (for example, via AMR over IP). The WSS 390 may also be configured to support communications with other, possibly conventional BSCs 210 via A I/F, in addition to control of the WMG 280 (for example, via H.248). Consequently, a core wireless network 301 may substantially comprise the iBSC 215, the WMG 280, and the WSS 390, each of which may be of conventional or next-generation technology, except to the extent that the WSS 390 and/or other element of the core network 301 may be integrated with the mobility manager 250 or mobility management functions described herein.

The BSC 110 communicates with UE clients 170 via at least one BS 160. Each UE client 170 may be single mode, dual mode, or multi-mode handsets substantially similar to those shown in FIG. 1A, although the UE clients 170 are depicted in FIG. 2 as being dual-mode, GSM/WiFi handsets, and thus configured for VoWiFi operation. One or more of the UE clients 170 may communicate with a BSC 210 via the associated BS 160 via DTAP (Direct Transfer Application Part, or Direct Transfer Application sub-Part, also known as GSM L3, depending on the implementation/technology generation). One or more of the UE clients 170 may alternatively communicate with iBSC (integrated BSC) 215, or may be configured to communicate with both the BSC 210 and the iBSC 215. The iBSC 215 may be substantially similar to the BSC 210 with the exception of added functionality, including functionality other than that conventionally found in a BSC. For example, the iBSC 215 may include functions traditionally found in one or more of a conventional MSC, BS, BTS, and/or other wireless communications network element. Communication between a UE client 170 and the iBSC 215 may be via DTAP or variations thereof, including DTAP over IP.

The network 200 also includes at least one access point 125 that is substantially similar to the access point 125 shown in FIG. 1A, as well as at least one MG 280, depicted in the embodiment shown in FIG. 2 as a wireless MG (WMG). The WMG 280 may be substantially similar to the MG shown in FIG. 1A, and is configured to receive, switch, and send wireless-origin and/or packet communications in addition to TDM/PCM communications. One embodiment of the WMG 280 is shown in FIG. 4, as further described below. Additional aspects of the WMG 280 are disclosed in commonly-assigned U.S. patent application Ser. No. 11/121,626, filed May 4, 2005, entitled "APPARATUS AND METHODS FOR PER-SESSION SWITCHING FOR MULTIPLE WIRELINE AND WIRELESS DATA TYPES."

The WMG 280 may also be configured to communicate with the iBSC 215 or other BSC via one or more of various suitable protocols, including without limitation MGCP, H.248 and/or MEGACO. One or more functions of the iBSC 215 and the WMG 280 may thus cooperate to form or operate as a UMA network controller (UNC) 201. The iBSC 215 and/or other function/element of the UNC 201 may be configured to communicate with the MSC 220, possibly via BSSAP (Base Station System Application Part), another protocol conventionally utilized for communication between a BS and an MSC, and/or other protocols.

Implementation of an embodiment of a mobility manager according to aspects of the present disclosure may allow seamless transitions (roaming and/or handover) between cellular (RAN) and unlicensed wireless networks, and/or seamless delivery of mobile voice and data services over unlicensed wireless networks. Such implementation may also be configured to provide the same mobile identity on cellular networks as on unlicensed wireless networks. As a consequence of these and/or other aspects, investment in existing/future mobile core network infrastructure may be preserved, possibly due at least in part to an independence from underlying unlicensed spectrum technology (e.g., WiFi, Bluetooth, among others). Moreover, such implementation may be transparent to existing, standard CPE devices (e.g. access points, routers and modems, among others). Some aspects of the mobility manager may also provide utilization of standard broadband IP access networks and/or other potentially "always on" networks (e.g., DSL, Cable, T1/E1, Broadband Wireless, FTTH, among others). Security of communications supported by the mobility manager may also be configured to be equivalent to current GSM mobile networks, among others.

Additionally, implementations of the mobility manager may have little or no impact to operations of cellular networks (e.g., spectrum engineering, cell planning, among others), and may be configured for integration with MGs and MGCs that are currently installed/deployed or otherwise supportive of existing technology. For example, one embodiment of the mobility manager may support direct interaction with the HLR/HSS, among other elements. Aspects of the mobility manager may also allow evolution to other technology, such as IP Multimedia Subsystem (IMS), among others, and may be configured to permit converged service bundles with such technology, such as 3GPP, IMS, and/or other technology, including where the bundled service includes whether existing, installed, or deployed.

Aspects of the mobility manager disclosed herein may also allow subscribers to have one unique identity and/or identifier (e.g., their phone number) yet access more than one network or type of network, including combinations of licensed and unlicensed networks (e.g., a cellular RAN and a UMA network). The mobility manager may be configured or configurable to support one or more specific SIP-enabled devices, or any SIP-enabled device.

One or more of the mobility management aspects described herein may support various UMA solutions permitting service providers to merge cellular or licensed networks with wireless LANs, WiFi, Bluetooth and other unlicensed networks into one seamless service or service-bundle, with one mobile device (user-equipment), one user interface, and a common set of network services for both voice and data. Such solutions may converge cellular networks with IP and other packet-based, wireless access networks, including IEEE 802.16 (WiMAX) networks, IEEE 802.20 (MBWA) networks, and UWB networks, among others. Consequently, subscribers may roam between the licensed and unlicensed networks with seamless voice and data session continuity as transparently as they move within licensed networks along. In some embodiments, seamless handover between the licensed and unlicensed networks may ensure that a user's location and/or mobility do not affect the services delivered to the user, such that the subscriber may experiences substantially or entirely transparent service, location, and mobility, where services may be identical when connected over either the licensed or unlicensed network.

Service providers implementing one or more aspects of the present disclosure may offer enhanced service plans that expand their portfolio from traditional wireless services to also include wireline service. Similarly, wireline service providers implementing one or more aspects of the present disclosure may add wireless services to their traditional local, long distance, and broadband access, yet preserve traffic over the wireline network infrastructure. In many cases, subscribers may experience a seamless service, with substantially invisible network boundaries.

Implementing one or more mobility management and/or other aspects of the present disclosure may effectively create a parallel radio access network. At least in some embodiments, this UMA network may interface with the wireless core network utilizing existing, often standard interfaces, such that the wireless core network may remain substantially unchanged. Existing service provider infrastructure, such as Business Support Systems (BSS), service delivery systems, content services, regulatory compliance systems, and Operation Support Systems (OSS), among others, may thus be configured to support the UMA network without substantial change, and possibly with no change to the existing infrastructure other than the integration of the mobility management functionality with the existing infrastructure. Accordingly, wireless service enhancements and technology evolution can apply transparently.

Aspects of the present disclosure may thus support an end-to-end solution involving subscriber-owned or subscriber-provided elements and service-provider network elements. As described above, these elements may include network equipment (e.g., UNC 201 of FIG. 2) and subscriber equipment (e.g., user-equipment 170 and/or access points 125 of FIGS. 1-3). In addition, the network elements enabling mobility management may be configured to interface or otherwise interwork with standard, deployed ("existing") network equipment in the licensed wireless network.

In addition to such subscriber equipment and the network equipment, a broadband, IP or other packet-based subscription may provide the transport of unlicensed wireless traffic to the licensed wireless core network. For example, an "always-on," shared Internet access may be sufficient. In some embodiments, enterprise subscribers may utilize enterprise packet-based network access, while residential subscribers may utilize residential broadband Internet access means such as DSP and digital cable.

In some implementations within the scope of the present disclosure, the "up" interface may operate between a UNC (e.g., UNC 201 of FIG. 2) and an access point (e.g., access points 125 of FIGS. 1-3) using IP transport to carry licensed wireless signaling and bearer traffic between the access point and the licensed wireless core network. Consequently, modifications to the licensed wireless core network may be mitigated while still supporting the fall range of licensed wireless features and services. For example, in a GSM/GPRS implementation, the licensed wireless services may include all GSM/GPRS services, including IN/CAMEL, MMS, SMS, VMS, and WAP, among others, where mobility is provided by an inter-network handover employing standard GSM/GPRS signaling mechanisms between user-equipment, a BSC/RNC, a UNC, an MSC, and an SGSN. Security may be provided as end-to-end, SIM-based authentication for subscription security.

The "up" interface may be carried over the air between user-equipment and access points, and over the public Internet or private IP or other packet-based network from access points to the licensed wireless core network. Where concerns arise regarding security of such network paths, the up interface may employ an IPsec tunnel to establish a secure communication path between the access point and the UNC. For example, the UNC and access point may mutually authenticate each other and encrypt communication therebetween. The IPsec tunnel may provide a safe, virtual network for the licensed wireless signaling and bearer traffic to flow between the access point and the UNC.

Referring to FIG. 4, illustrated is a schematic view of at least a portion of one embodiment of an apparatus 400 according to aspects of the present disclosure. The apparatus 400 may be, include, or be employed with a media gateway and/or a softswitch. Although not limited to such within the scope of the present disclosure, a media gateway may be, include, or be employed with one or more circuit switches, internet-protocol (IP) gateways, and/or channel banks that convert data from the format required for one type of network to the format required for another. A media gateway may terminate channels from a circuit-switched network as well as streaming media from a packet-switched network, such as real-time-transport-protocol (RTP) streams in an IP network. Data input could be audio, video, or T.120 (real-time multi-point communications), which the media gateway could handle simultaneously or otherwise. The media gateway controller may sometimes be referred to as a softswitch.

In some embodiments, a softswitch may be, include, or be employed with open API software. Such API software and/or media gateway or component(s) thereof may be singularly or collectively employed to bridge: (1) one or more PSTNs and one or more VoP networks; (2) one or more other PSTN applications and/or apparatus and one or more other VoP applications and/or apparatus; (3) two or more PSTN applications and/or apparatus; and/or (4) two or more VoP applications and/or apparatus.

The apparatus 400 includes a mobility manager 460 (or mobility manager module 460) which may be substantially similar in many aspects to the mobility manager apparatus and/or functions described above with respect to FIGS. 1A-1C, 2 and 3. The mobility manager 460 may be integral to the apparatus 400, such as being physically located within a housing, card, blade, processor, circuit, compartment, chassis, or other portion of the apparatus 400. The mobility manager 460 may also be connected to or otherwise in communication with one or more other components of the apparatus 400, such as the components described below. In other embodiments, such as illustrated in FIG. 1A, the mobility manager 460 may be a separate, discrete component which may be located adjacent, proximate, or remote from the apparatus 400.

In the embodiment shown in FIG. 4, the apparatus 400 also includes a non-packet network interface (NP-NI) 410, a non-packet switching matrix (NP-SM) 420, a multi-service module (MSM) 430, a packet switching matrix (P-SM) 440, and a packet network interface (P-NI) 450. The apparatus 400 may also include a control module 405 in communication with and/or configured to control one or more of the NP-NI 410, NP-SM 420, MSM 430, P-SM 440, and P-NI 450. The scope of the present disclosure also does not limit the various configurations of the apparatus 400 to the embodiment shown in FIG. 4. For example, the apparatus 400 may comprise two or more NP-NIs 410 and/or two or more P-NIs 450.

The NP-NI 410 is configured to directly or indirectly interface with a non-packet network or portion thereof. For example, the NP-NI 410 may permit the transfer of TDM voice, data, and/or signaling (hereafter collectively referred to as data) into and out of the apparatus 400. The NP-NI 410 may be configured to handle both inbound and outbound traffic. That is, the NP-NI 410 may receive data external to the apparatus 400, such as from the network to which it is connected, and may also receive data from internal to the apparatus 400. Consequently, the NP-NI 410 may also send data external to the apparatus 400, such as to the network, and may also send data internal to the apparatus 400. In other words, the NP-NI 410 may be a two-way traffic port, supporting bidirectional traffic flow into and away from the apparatus 400.

The NP-SM 420 is configured to receive TDM and/or other non-packet data from the NP-NI 410, possibly from two or more NP-NI 410. Consequently, the NP-SM 420 also transmits non-packet data after appropriate switching has been performed. The NP-SM 420 switches incoming non-packet signals onto an outgoing port for subsequent analysis, manipulation, and/or transmission.

The MSM 430 is configured to receive packet data and non-packet data, or to receive data originating from both packet and non-packet data sources. Upon receipt, the MSM 430 may perform voice encoding/decoding, echo cancellation, and/or conversion of signals between non-packet modes and/or packet modes. The MSM 430 may also include a switching matrix which may be configured to handle non-packet data, such that TDM or other non-packet data switched by the NP-SM 420 may be directly communicated between the two switching matrices. In some embodiments, the switching matrix integral to the MSM 430 may be configured to handle data from any data source, including non-packet data sources and packet data sources, although such data may require conversion to a common format prior to handling by the switching matrix integral to the MSM 430, as described above.

The P-SM 440 performs substantially the same functions as the NP-SM 420, although for packet signals instead of non-packet signals. For example, the P-SM 440 may receive packet signals from the P-NI 450, including packet signals from a variety of different types of packet signals, including wireless packet signals. For example, the P-NI 450 may be configured to receive (and send) one or more of ATM signals, VoIP signals, and/or UMTS signals.

The control module 405 is configured to receive requests/messages from the MSM 430, the NP-SM 420, the P-SM 440, and/or any of the network interfaces 410, 450. The control module 405 may then process each request and determine an appropriate action, such as switching between standby and operation states, collecting data, allocating resources, and others, according to network conditions and predefined rules, among other possible considerations. Consequently, the control module 405 (or components thereof) may be in direct or indirect communication with the MSM 430, the NP-SM 420, the P-SM 440, and/or any of the network interfaces 410, 450, and may send commands and/or instruction thereto.

Figure 5:
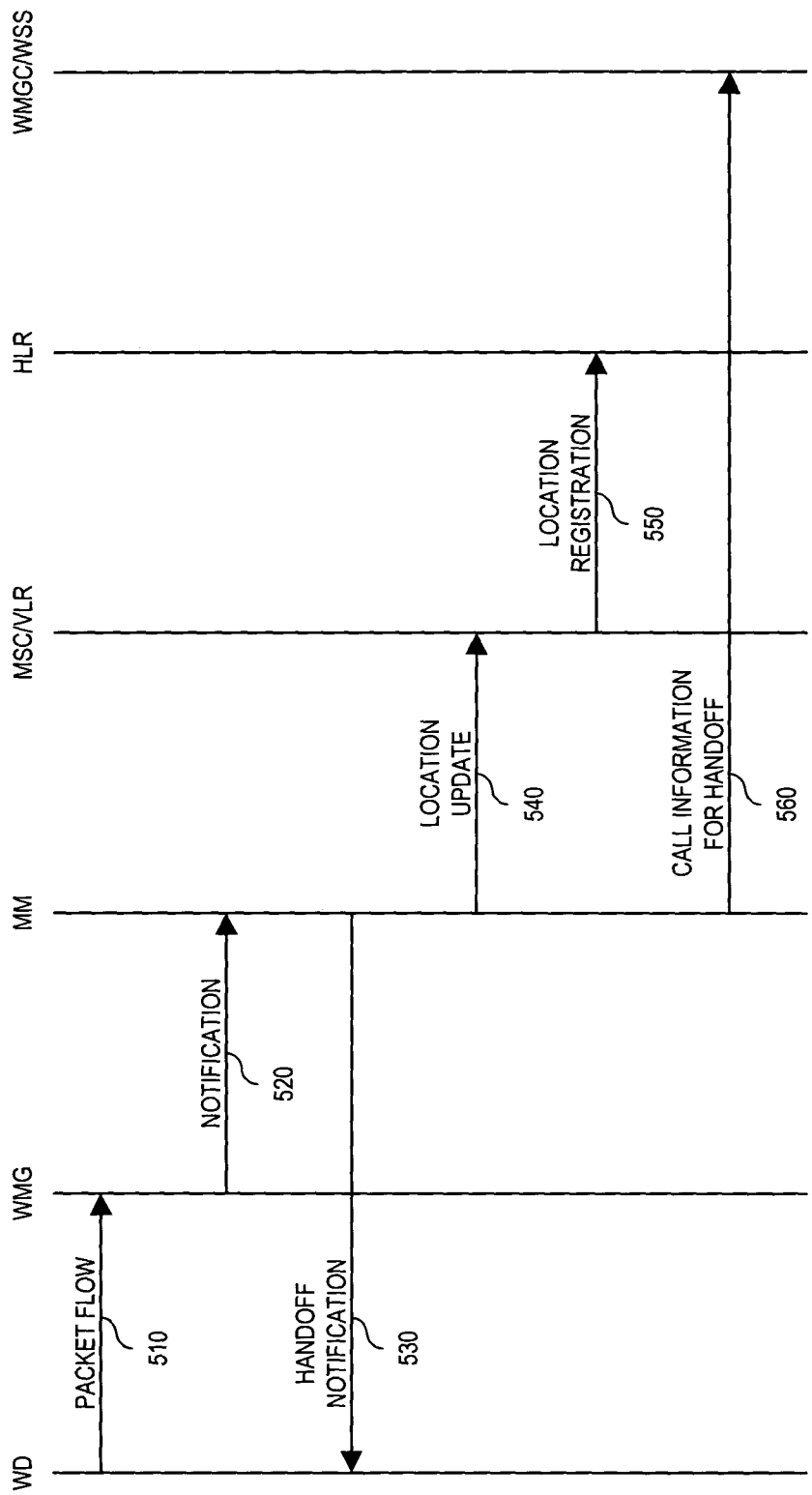
FIG. 5 is a message-flow diagram of at least a portion of an embodiment of a handoff method according to aspects of the present disclosure.

Referring to FIG. 5, illustrated is a message-flow diagram of at least a portion of one embodiment of a handoff method according to aspects of the present disclosure. The messages depicted in FIG. 5 are communicated between a wireless device (WD), a wireless media gateway (WMG), a mobility manager or mobility manager module (MM), a mobile switching center with associated visitor location register (MSC/VLR), a home location register (HLR), and a wireless media gateway controller and/or wireless softswitch (WMGC/WSS). These components may be substantially similar to similarly-named components described above. For example, the MM may be a discrete component in the network, or may be integrated, co-located or otherwise spatially associated with the WMGC or other component of the network.

The WMG may provide barrier transport to a wireless/multi-media call, as described above. The WMG may also be configured to monitor one or more performance parameters associated with the call, and/or to detect when one or more performance parameters fall below a degradation threshold. The WMG may detect such a performance degradation event from monitoring the packet flow 510 from the WD after the WD roams into the LA associated with the WMG. Consequently, the WMG sends a notification 520 to the MM, either directly or indirectly via the WMGC/WSS, such as by use of SIP messages.

The notification 520 sent by the WMG to the MM may include information indicating that one or more monitored performance parameters have fallen below one or more predetermined thresholds corresponding to the one or more monitored performance parameters. Alternatively, the notification 520 sent by the WMG to the MM may include the results of monitoring the one or more performance parameters, such that the MM may make the comparison of the monitored results to one or more predetermined thresholds corresponding to the one or more monitored performance parameters.

The performance parameters that may be monitored by the WMG may be packet media parameters. Alternatively, or additionally, signaling level parameters may be monitored, although such monitoring may be performed by the WMGC instead of by the WMG. Examples of the performance parameters that may be monitored include one or more of packet rate, error rate, average delay, variation in delay among one or more groups of packets, and packet losses, among others. The WMG, WMGC, and/or other component configured to monitor the one or more performance parameters, or the MM or other component in communication therewith, compares the monitored performance parameter(s) with one or more predetermined thresholds corresponding to the one or more monitored performance parameters. The one or more predetermined thresholds may be user-defined, and possibly based on specific network conditions.

For example, the average delay may be monitored to detect performance degradation indicated by delay exceeding about 250 ms. Alternatively, or additionally, the packet loss rate may be monitored to detect performance degradation indicated by the packet loss rate exceeding about 5%. Performance degradation may also be indicated by a packet loss rate exceeding only about 1-2%, however, in the absence of any packet loss concealment mechanism. Nonetheless, embodiments within the scope of the present disclosure are not limited to these examples. Many other performance parameters and corresponding thresholds (quantitative or otherwise) are also within the scope of the present disclosure, many of which may be industry standards. Predetermined thresholds may in some case be determined by specific customer requirements, applications, and network conditions, such as a particular codec utilized in an implementation. Accordingly, the tolerance levels of packet loss and other performance parameters can be quite different from one implementation to the next.

After the monitored performance parameters have been compared to their corresponding thresholds to determine if performance has deteriorated beyond acceptable levels, the MM may consult its decision module and handoff rules, for example, to determine to handoff the call between the cellular and local wireless area networks. Consequently, the MM sends a message 530 to the WD to notify the WD of the handoff decision, such that the WD can prepare to switch to a different wireless frequency mode (e.g., from 2G to Wi-Fi, or from UMTS to Wi-Fi). The MM also sends a location update message 540 to the MSC, which launches a registration query to its associated VLR.

The VLR then updates its record on the location of the WD. If the new LA belongs to a different VLR, the VLR determines the address of the HLR of the WD from its MIN, such as by global Title Translation. The new VLR then sends a location registration message 550 to the HLR. The MM also sends a handoff message 560 to the WMGC/WSS, and the WMGC/WSS sets up a new connection connecting the WD to the called party.

Figure 6:
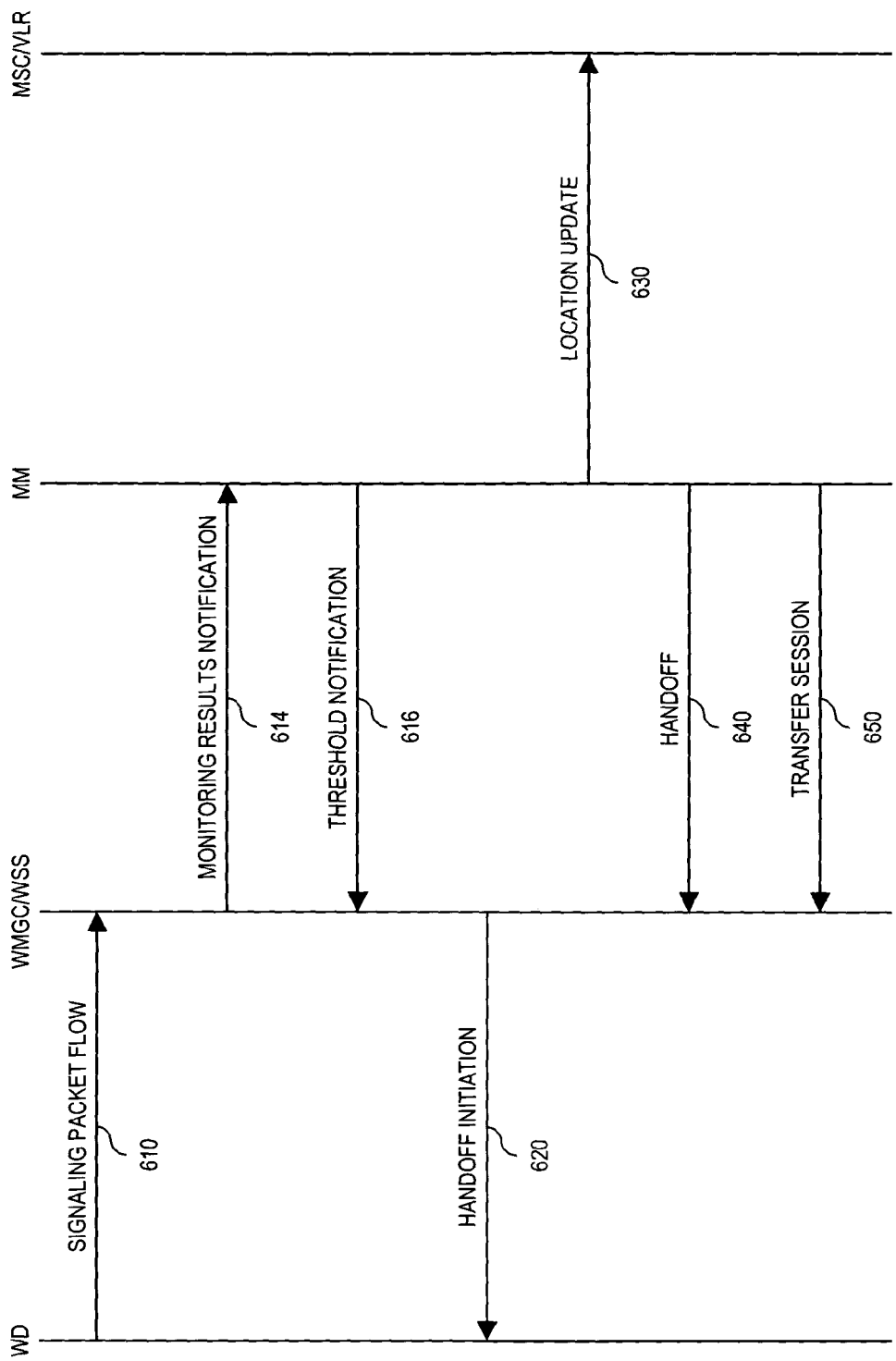
FIG. 6 is a message-flow diagram of at least a portion of another embodiment of the method shown in FIG. 5.

Referring to FIG. 6, illustrated is a message-flow diagram of at least a portion of another embodiment of a handoff method according to aspects of the present disclosure. The messages depicted in FIG. 6 are communicated between a wireless device (WD), a mobility manager or mobility manager module (MM), a mobile switching center with associated visitor location register (MSC/VLR), and a wireless media gateway controller and/or wireless softswitch (WMGC/WSS). These components may be substantially similar to similarly-named components described above.

In the embodiment shown in FIG. 6, the performance of an IP-based signaling stream can trigger a handoff as the WMGC and/or MM monitors the signaling stream coming from the WD and/or a notification from the WD of the presence of an alternative wireless network (e.g., a Wi-Fi network). The WMGC and/or MM monitors the signaling packet stream 610 from the WD to detect a performance-threshold-crossing event for a user signaling message and a report from the WD of the presence of Wi-Fi signals.

For example, the WMGC may monitor the signaling packet stream 610 and forward the monitoring results 614 to the MM, and the MM may compare the results to predetermined threshold levels. Alternatively, or additionally, the WMGC may monitor the signaling packet stream 610 and compare the monitoring results to the predetermined threshold levels, and only send results to the MM when performance falls below the predetermined threshold levels. In either case, by consulting its decision module and handoff rules, and possibly comparing signaling levels to predetermined thresholds, the MM may determine to initiate handoff between the cellular and local wireless area networks.

For example, when a monitored performance parameter drops crosses a corresponding threshold, the MM may send notification 616 of such a threshold-crossing event to the WMGC/WSS. Consequently, the WMGC/WSS sends a message 620 to the WD to notify the WD of the handoff decision, such that the WD can prepare to switch to a different wireless frequency mode (e.g., from 2G to Wi-Fi, or from UMTS to Wi-Fi). The MM also sends a location update message 630 to the MSC, which launches a registration query to its associated VLR.

The VLR then updates its record on the location of the WD. If the new LA belongs to a different VLR, the VLR determines the address of the HLR of the WD from its MIN, such as by global Title Translation. The new VLR then sends a location registration message to the HLR. The MM also sends a handoff message 640 to the WMGC/WSS with the user session information, such as calling party info and called party info.

The WMGC/WSS then sets up a new connection connecting the WD to the remote end via the wireless LAN. The MM subsequently sends instructions 650 to the WMGC/WSS to transfer the user session/call from the old connection to the new one.

Figure 7:
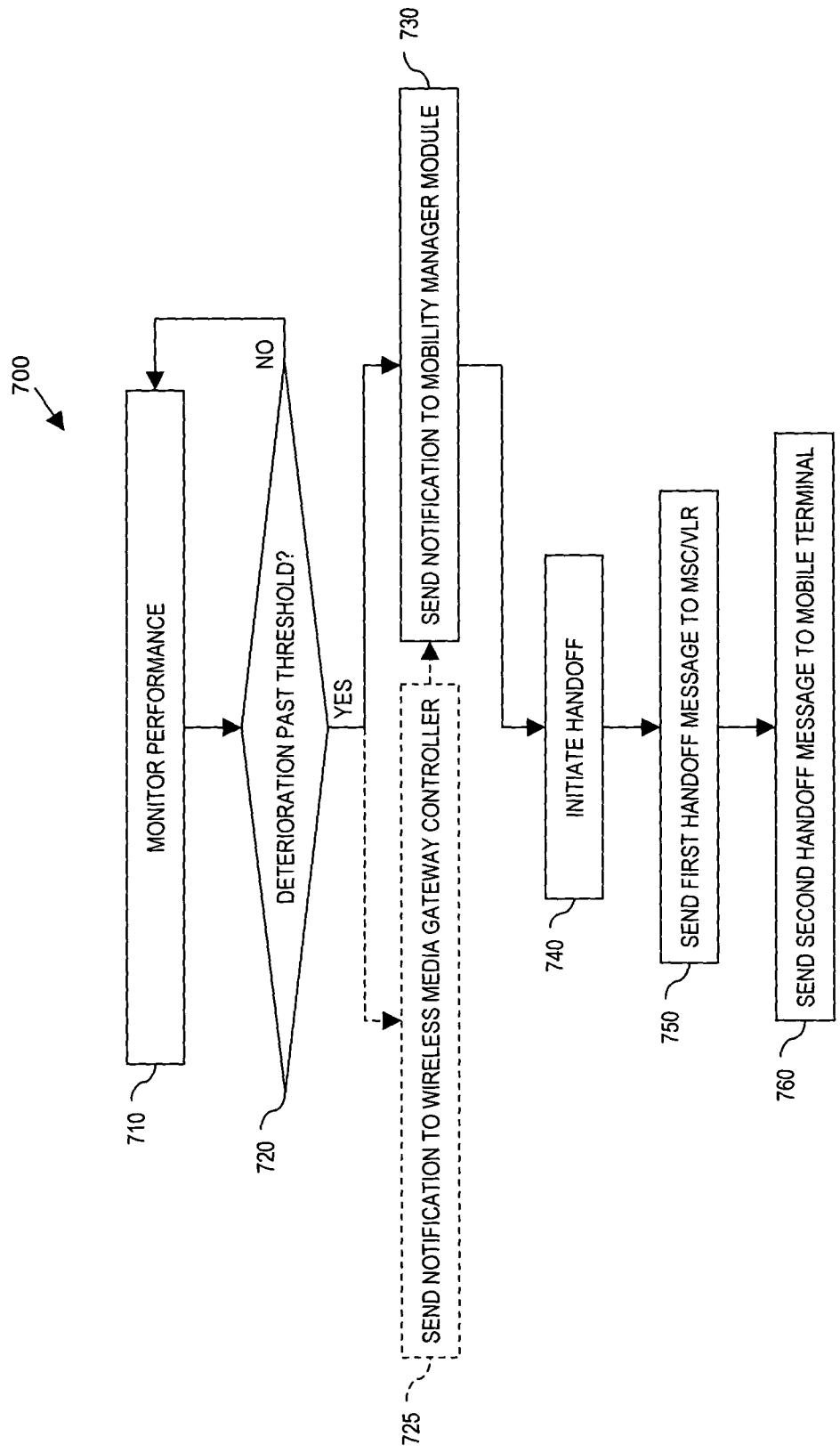
FIGS. 7 and 8 are flow-chart diagrams of at least a portion of embodiments of methods according to aspects of the present disclosure.

Referring to FIG. 7, illustrated is a flow-chart diagram of at least a portion of an embodiment of a method 700 supporting handoff of a wireless call based on monitored media and/or signaling performance according to aspects of the present disclosure. The method 700 includes a step 710 during which packet media and/or signaling performance of the wireless call is monitored. The monitoring may be performed by a wireless media gateway, which may be configured primarily for wireless communications or for both wireless and wireline (PSTN and/or IP) communications, such as the media gateway 400 described above with respect to FIG. 4. The monitoring may also or alternatively be performed by a wireless media gateway controller and/or softswitch associated with a wireless media gateway. The monitoring performed during step 710 may include monitoring packet rate, error rate, average delay, variation in delay among one or more groups of packets, and packet loss, among other parameters related to packet media or signaling level performance.

During a decisional step 720, the one or more parameters monitored during step 710 are compared to one or more thresholds related to performance. The one or more thresholds may be user-selected, predetermined, hardwired, hard-coded, or otherwise programmed or input, and may comprise industry performance standards. If a monitored performance parameter deteriorates below the corresponding threshold, as determined in decisional step 720, a notification message is sent to a mobility manager or mobility manager module during a subsequent step 730 of the method 700. Otherwise, if no such threshold-crossing events occur, steps 710 and 720 are repeated to continue monitoring performance and comparing performance to predetermined threshold levels.

The comparison of the monitored performance parameters with corresponding thresholds may be performed by the wireless media gateway if a monitored parameter regards packet media performance. However, if a monitored parameter regards signaling level performance, the comparison of monitored performance parameters with corresponding thresholds may be performed by the wireless media gateway controller. Thus, the monitoring of step 710 and threshold comparison of step 720 may collectively comprise forwarding information from the wireless media gateway or wireless media gateway controller to the mobility manager module only when a monitored performance parameter crosses a corresponding threshold. However, in other embodiments, the monitored performance parameter information may be regularly forwarded from the wireless media gateway or wireless media gateway controller to the mobility manager module such that the mobility manager may also or alternatively perform the threshold comparison.

The mobility manager module may be a discrete network component configured to communicate with the wireless media gateway and/or the wireless media gateway controller, such as the mobility manager 150 shown in FIG. 1A. However, the mobility manager module may also be co-located, integrated, or otherwise spatially associated with the wireless media gateway controller, a wireless softswitch, a combination component functioning as both the wireless media gateway controller and a wireless softswitch, or another network component, such as the mobility manager 250 shown in FIG. 3.

The method 700 may entail sending notification to the mobility manager module directly when the packet performance deteriorates beyond the corresponding threshold, as indicated by the solid arrow in FIG. 7 extending from decisional step 720 to step 730. However, such notification may alternatively (or additionally) be sent to the mobility manager module indirectly via one or more other components in the network associated with the wireless media gateway. For example, as indicated by dashed arrows in FIG. 7, if it is determined in decisional step 720 that performance has deteriorated beyond the corresponding threshold, the notification message may be sent to the wireless media gateway controller in step 725 before the notification message is then forwarded to the mobility manager module in step 730.

In a subsequent step 740, handoff of the wireless call is initiated, based on the deteriorated packet media and/or signaling level performance and receipt of the notification message, collectively. A handoff message is then sent to an MSC/VLR module in a step 750, where the MSC/VLR module may be configured to operate as both a mobile switching center and a visitor location register. An additional handoff message is then sent to a mobile terminal of the wireless call in a subsequent step 760. Additional steps may thereafter be performed to complete the handoff, perform additional handoffs, and/or otherwise support the duration of the wireless call.

Figure 8:
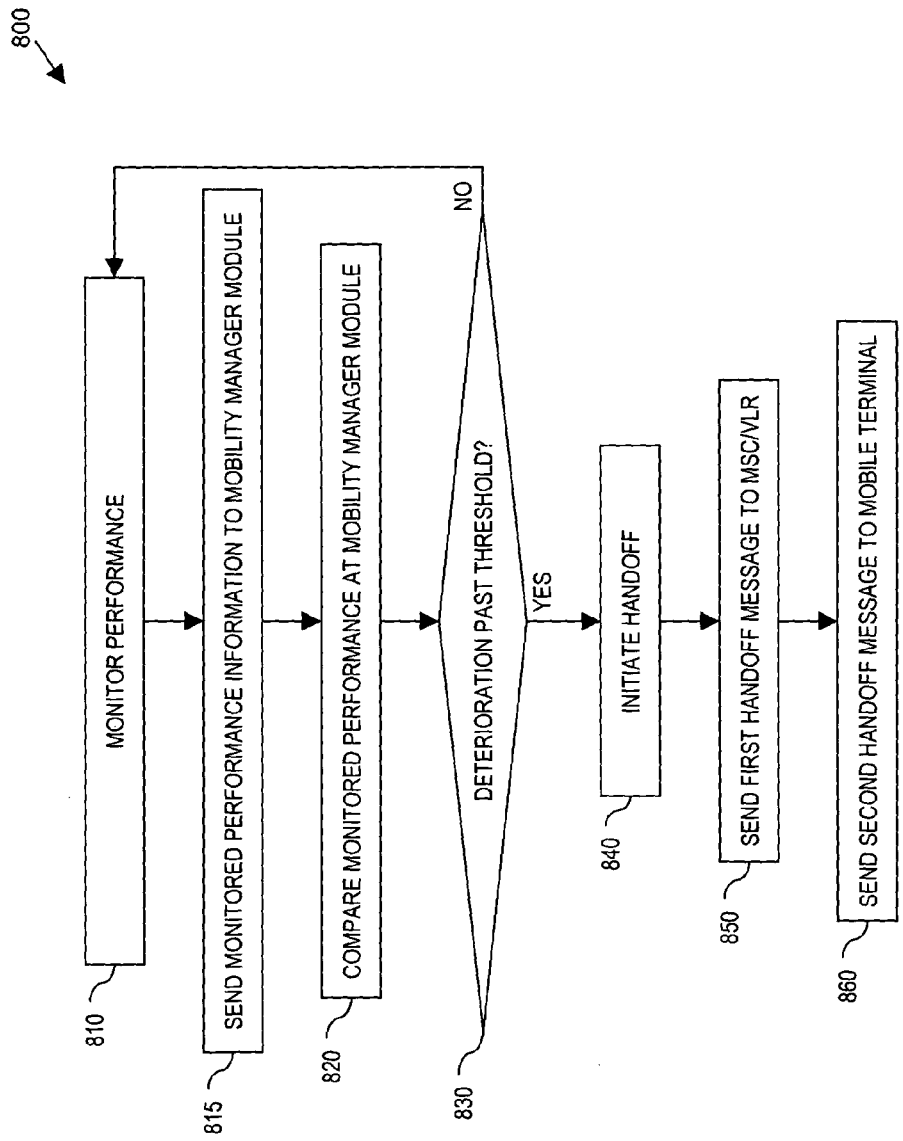

Referring to FIG. 8, illustrated is a flow-chart diagram of at least a portion of another embodiment of the method 700 shown in FIG. 7, herein designated by the reference numeral 800. The method 800 includes a step 810 during which packet performance of a wireless call is monitored, possibly in a substantially similar manner to the monitoring performed during step 710 of method 700 shown in FIG. 7. The monitoring may be performed by a wireless media gateway, which may be configured primarily for wireless communications, or configured for both wireless and wireline (PSTN and/or IP) communications, such as the media gateway 400 described above with respect to FIG. 4. The monitoring may also or alternatively be performed by a wireless media gateway controller and/or softswitch associated with a wireless media gateway. The monitoring performed during step 810 may include monitoring one or more parameters related to packet performance, such as packet rate, error rate, average delay, variation in delay among one or more groups of packets, and packet loss, among others.

Results of the performance monitoring performed in step 810 may then be sent to a mobility manager or mobility manager module during a step 815, where they may be compared to one or more predetermined thresholds during a step 820. The mobility manager module may be a discrete network component configured to communicate with the wireless media gateway and/or the wireless media gateway controller, such as the mobility manager 150 shown in FIG. 1A. However, the mobility manager module may also be co-located, integrated, or otherwise spatially associated with the wireless media gateway controller, a wireless softswitch, a combination component functioning as both the wireless media gateway controller and a wireless softswitch, or another network component, such as the mobility manager 250 shown in FIG. 3.

Step 815 may entail sending the performance monitoring results to the mobility manage module on a regular basis, such as at user-defined or otherwise predetermined time intervals. However, step 815 may alternatively entail sending performance monitoring results to the mobility manage module only in response to the occurrence of certain events or predetermined network conditions. Moreover, when the performance monitoring results are sent to the mobility manager module during step 815, the results may be sent directly to the mobility manager module, or they may be sent to the mobility manager module indirectly, such as through a media gateway controller and/or one or more other network components.

If the results of the comparison performed during step 820 indicate that a performance parameter has not deteriorated beyond a corresponding threshold, as determined by a decisional step 830, the method 800 returns to step 810 and performance monitoring is continued. However, if the results of the comparison performed during step 820 indicate that a performance parameter has deteriorated beyond a corresponding threshold, as determined by a decisional step 830, handoff of the wireless call is initiated in a subsequent step 840. A handoff message may then be sent to an MSC/VLR module in a step 850, where the MSC/VLR module may be configured to operate as both a mobile switching center and a visitor location register. An additional handoff message may then be sent to a mobile terminal of the wireless call in a subsequent step 860. Additional steps may thereafter be performed to complete the handoff, perform additional handoffs, and/or otherwise support the duration of the wireless call.

Mobility Management

The above-described embodiments of mobility managers, mobility management modules, and mobility management systems can each be part of or combined with a wireless media gateway controller or a wireless softswitch/MSC, or may be independently deployed as a separate, discrete network element. Such mobility management functions within the scope of the present disclosure may include two modules: a location management module and a handoff management module. Moreover, as described below, each of the modules may contain several submodules implementing location management and handoff functions.

The location management module may include a location registration submodule and a call delivery submodule. Thus, location management may be a two-stage process that enables the network to discover the current attachment point of the mobile user for call delivery.

In the first stage, location registration (or location update), a wireless device may periodically notify the network of its location and new access point, allowing the network to authenticate the user and revise the user's location profile. The location registration may be initiated by a wireless device when it reports its new location to the network. This process is called location update. In one embodiment, a location update is performed whenever a wireless device enters a new location area. It can also or alternatively be initiated by the wireless device entering a different wireless network that the device can also support, such as a Wi-Fi network.

In the second stage, call delivery, the network is queried for the user location profile and current position of the wireless device. The call delivery submodule may involves two steps: (1) determining the serving VLR of the called wireless device; and (2) determining the location of the called party, which can be wireless device or a wireline terminal. Locating the serving VLR of the wireless device involves interactions with HLR and MSC/wireless softswitch via signaling message exchanges. In one embodiment, the signaling message exchange is accomplished via SIP signaling messages.

Handoff management enables the network to maintain a user's connection as the wireless device moves to a new location, or when a certain network event occurs (e.g., network performance degradation crossing a threshold). "Handoff" means that the existing network connection is replaced with a new connection, while the effect on the user session is either transparent or minimized. In one embodiment, there are three stages involved in handoff management: handoff initiation, connection management and dataflow control.

A handoff may be initiated by a wireless device entering a new serving area or detecting a new wireless signal (e.g, when a dual-band phone detects Wi-Fi signals or capabilities). A handoff may also be initiated by a changing network condition. One network condition change is deterioration of wireless signals beyond a predefined point. Additionally, or alternatively handoff is initiated user session performance is being monitored by a wireless media gateway and a performance parameter crosses a predetermined threshold. For example, the packet loss on a user session exceeding a predefined threshold, possibly combined with other considerations, may trigger a handoff.

Connection management may involve generating a new connection for the user session. The mobility management system may interact with the MSC/wireless softswitch to perform resource allocation and connection routing, as needed to establish a new connection for the user session. In one embodiment, the mobility management system communicates with the wireless media gateway controller via SIP signaling messages for resource allocation, and the media gateway controller in turn communicates with a wireless media gateway (e.g., via Megaco or H.248) to allocate required resource for the new connection. The mobility management system may also communicate with wireless softswitch/MSC to determine a route for the new connection to the called party.

The third stage of handoff, dataflow control, transfer the user session from the old connection path to the established new one with minimal interruption to the user session. In one embodiment, data flow control is achieved by a wireless media gateway controller communicating with a wireless media gateway, where necessary packet buffering and re-sequencing are performed for call transfer to the established new connection.

These aspects of a mobility management system are applicable or readily adaptable to embodiments described above or otherwise within the scope of the present disclosure. Moreover, the foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A wireless mobility management system, comprising:
a visitor location register configured to store a visiting user profile and communicate with a mobile switching center to route a wireless call;
a home location register configured to store a home user profile and update a user location associated with the home user profile;
a wireless media gateway (WMG) configured to create a interconnection between a wireless network and a second network that includes a wireless packet network, including providing physical resources for the call;
a WMG controller integrated with a wireless softswitch and configured to control the WMG to allocate resources, establish connections as required by the call, and further configured to monitor signaling packets associated with the call to generate signaling level performance data; and
a performance-based mobility manager configured to receive the signaling level performance data from the WMG controller, thereafter make a handoff decision to transfer the call from the wireless network to the second network based on the received signaling level performance data, and to initiate the sending of a location update message to the mobile switching center in response to deciding that the call is to be transferred from the wireless network to the second network, wherein the mobile switching center sends a message to the visitor location register and the visitor location register updates the stored user location based on the handoff decision, and sending a handoff message to the WMG controller to transfer the call from the wireless network to the second network.

2. The wireless mobility management system of claim 1 wherein the mobility manager is configured to receive the performance data directly from the WMG.

3. The wireless mobility management system of claim 1 wherein the mobility manager is configured to receive the performance data from the WMG indirectly.

4. The wireless mobility management system of claim 1 wherein the mobility manager is configured to compare the received signaling level performance data with a predetermined threshold to make the handoff decision.

5. The wireless mobility management system of claim 1 wherein the mobility manager is further configured to initiate handoff based on the handoff decision.

6. A wireless media gateway controller, comprising:
a location management module configured to update a location and profile of a wireless subscriber and determine a serving visitor location register (VLR) and location of a called party in a wireless network; and
a handoff management module configured to receive, from a wireless device associated with the wireless subscriber signaling level performance data associated with a call, the signaling level performance data being generated by the wireless media gateway controller by monitoring signaling packets associated with the call, the handoff management module being further configured to initiate a handoff based on the signaling level performance data of the call, establish a new connection for the call, transfer the call from an existing connection over the wireless network to the new connection over a second network that includes a wireless packet network, initiate the sending of a location update message to a mobile switching center in response to a decision made by a mobility manager module that the call is to be transferred from the wireless network to the second network, wherein the mobile switching center sends a message to the visitor location register and the visitor location register updates the location of the wireless subscriber, and receive a handoff message from the mobility manager module to transfer the call from the wireless network to the second network.

7. The wireless media gateway of claim 6 wherein the handoff management module is configured to monitor the signaling level performance data and initiate the handoff based on comparison of the monitored signaling level performance data with a predetermined performance threshold.

8. The wireless media gateway of claim 6 wherein the initiated handoff is between a cellular network and an unlicensed wireless network.

9. The wireless media gateway of claim 8 wherein the cellular network is configured to support at least one of GSM, GPRS, GERAN, CDMA, and UMTS.

10. The wireless media gateway of claim 8 wherein the unlicensed wireless network is configured to support at least one of Bluetooth, IEEE 802.11, IEEE 802.16, IEEE 802.20, and UWB.

11. The wireless media gateway of claim 8 further comprising means for interfacing with at least one media gateway controller of the cellular network.

12. The wireless media gateway of claim 11 wherein the means for interfacing with at least one media gateway controller of the cellular network includes means for interfacing by session initiation protocol (SIP).

13. The wireless media gateway of claim 6 further comprising means for receiving, switching and sending data between GSM, GPRS, GERAN, CDMA, UMTS, IEEE 802.11, and TDM transmission facilities.

14. A method for performance-triggered handoff of a wireless call, comprising:
monitoring signaling packets associated with the wireless call and determining signaling level performance data of the wireless call at a wireless media gateway controller;
sending, by the wireless media gateway controller, a notification message to a mobility manager module when the monitored signaling level performance data indicates performance deterioration beyond a predetermined threshold;
initiating, at the mobility manager module, a handoff decision to transfer the wireless call between a wireless network and a second network that includes a wireless packet network, based on the monitored signaling level performance data and receipt of the notification message by the mobility manager module;
initiating, by the mobility manager module, the sending of a location update message to an MSC/VLR module configured to operate as both a mobile switching center and a visitor location register in response to a decision made by the mobility manager module to conduct the transfer of the wireless call from the wireless network to the second network, wherein the MSC/VLR module updates a stored location of the subscriber based on the handoff; and
sending, by the mobility manager module, a handoff message to the wireless media gateway controller to transfer the wireless call from the wireless network to the second network.

15. The method of claim 14 wherein sending the notification message to the mobility manager module includes sending the notification message to the mobility manager module directly when the monitored signaling level performance data indicates deterioration beyond the predetermined threshold.

16. The method of claim 14 wherein sending the notification message to the mobility manager module includes sending the notification message to the mobility manager module indirectly via a wireless media gateway controller when the monitored signaling level performance data indicates deterioration beyond the predetermined threshold.

* * * * *